United States Patent [19]
Liddy et al.

[11] Patent Number: 5,963,940
[45] Date of Patent: Oct. 5, 1999

[54] NATURAL LANGUAGE INFORMATION RETRIEVAL SYSTEM AND METHOD

[75] Inventors: Elizabeth D. Liddy; Woojin Paik; Mary E. McKenna, all of Syracuse, N.Y.; Ming Li, Jersey City, N.J.

[73] Assignee: Syracuse University, Syracuse, N.Y.

[21] Appl. No.: 08/698,472

[22] Filed: Aug. 14, 1996

Related U.S. Application Data

[60] Provisional application No. 60/002,451, Aug. 16, 1995, provisional application No. 60/002,452, Aug. 16, 1995, provisional application No. 60/002,453, Aug. 16, 1995, provisional application No. 60/002,470, Aug. 16, 1995, provisional application No. 60/002,471, Aug. 16, 1995, and provisional application No. 60/002,472, Aug. 16, 1995.

[51] Int. Cl.$^6$ .................................................. G06F 17/30
[52] U.S. Cl. .................................................. 707/5; 704/9
[58] Field of Search .......................... 707/3, 4, 5; 704/9

[56] References Cited

U.S. PATENT DOCUMENTS

| | | | |
|---|---|---|---|
| 5,148,541 | 9/1992 | Lee et al. | 707/2 |
| 5,265,065 | 11/1993 | Turtle | 707/4 |
| 5,301,109 | 4/1994 | Landauer et al. | 704/9 |
| 5,418,951 | 5/1995 | Damashek | 707/5 |
| 5,625,814 | 4/1997 | Luciw | 707/5 |
| 5,694,592 | 12/1997 | Driscoll | 707/3 |
| 5,696,962 | 12/1997 | Kupiec | 707/4 |
| 5,794,050 | 8/1998 | Dahlgren et al. | 395/708 |

OTHER PUBLICATIONS

Kimoto et al. "Automatic Indexing System For Japanese Text," Reveiw of the Electical Communications Laboratories, vol. 37, No. 1, pp. 51–55, 1989.

Salton et al. "The Smart Automatic Document Retrieval System—An Illustration," Commum. ACM, vol. 8, No. 6, pp. 391–398, Jun. 1965.

Croft Bruce et al., "Applications of Multilingual Text Retrieval," *Proceedings of the 29th Annual Hawaii International Conference on System Sciences*, 1996, vol. 5, pp. 98–107.

Liddy, Elizabeth D. et al., "An Overview of DR–Link and Its Approach to Document Filtering," *Proceedings of the ARPA Workshop on Human Language Technology*, Princeton, NJ, Mar. 21–24, 1993, pp. 358–362.

Liddy, Elizabeth D. et al., "Development, Implementation and Testing of a Discourse Model for Newspaper Texts," *ARPA Workshop on Human Language Technology*, Princeton, NJ, Mar. 21–24, 1993, pp. 1–6.

(List continued on next page.)

*Primary Examiner*—Jack M. Choules
*Attorney, Agent, or Firm*—Townsend and Townsend and Crew LLP

[57] ABSTRACT

Techniques for generating sophisticated representations of the contents of both queries and documents in a retrieval system by using natural language processing (NLP) techniques to represent, index, and retrieve texts at the multiple levels (e.g., the morphological, lexical, syntactic, semantic, discourse, and pragmatic levels) at which humans construe meaning in writing. The user enters a query and the system processes the query to generate an alternative representation, which includes conceptual-level abstraction and representations based on complex nominals (CNs), proper nouns (PNs), single terms, text structure, and logical make-up of the query, including mandatory terms. After processing the query, the system displays query information to the user, indicating the system's interpretation and representation of the content of the query. The user is then given an opportunity to provide input, in response to which the system modifies the alternative representation of the query. Once the user has provided desired input, the possibly modified representation of the query is matched to the relevant document database, and measures of relevance generated for the documents. A set of documents is presented to the user, who is given an opportunity to select some or all of the documents, typically on the basis of such documents being of particular relevance. The user then initiates the generation of a query representation based on the alternative representations of the selected document(s).

6 Claims, 21 Drawing Sheets

OTHER PUBLICATIONS

Liddy, Elizabeth D. et al., "DR–Link's Linguistic–Conceptual Approach to Document Detection," *Proceedings of First Text Retrieval Conference (TREC–1)*, Published Spring 1993, pp. 1–17.

Liddy, Elizabeth D., "DR–Link: A System Update for TREC–2," *Proceedings of Second Text Retrieval Conference (TREC–2)*, National Inst. of Standards and Technology, Aug. 31–Sep. 2, 1993, pp. 1–15.

Liddy, Elizabeth D. et al., "DR–Link System: Phase I Summary," *Proceedings of the Tipster Phase I Final Report*, Sep. 19–23, 1993 (Published 1994).

Liddy, Elizabeth D., "Development and Implementation of a Discourse Model for Newspaper Texts," *Proceedings of the AAAI Symposium on Empirical Methods in Discourse Interpretation and Generation*, Stanford, CA, Dec. 14–17, 1993, pp. 1–6.

Liddy, Elizabeth DuRoss, "An Alternative Representation for Documents and Queries," *Proceedings of the 14th National Online Meeting*, 1993, pp. 279–284.

Liddy, Elizabeth D. et al., "Text Categorization for Multiple Users Based on Semantic Features from a Machine–Readable Dictionary," *ACM Transactions on Information Systems*, vol. 12, No. 3, Jul. 1994, pp. 278–295.

Liddy, Elizabeth D. et al., "Document Retrieval Using Linguistic Knowledge," *Proceedings of the RIAO '94 Conference*, Oct. 11–13, 1994, pp. 106–114.

Liddy, Elizabeth et al., "Detection, Generation, and Expansion of Complex Nominals," *Proceedings of the Workshop on Compound Nouns: Multilingual Aspects of Nominal Composition*, Dec. 2–3, 1994, Geneva, Switzerland, pp. 14–18.

Liddy, Elizabeth D., "Development and Implementation of a Discourse Model for Newspaper Texts," *Proceedings of the ARPA Workshop on Human Language Technology*, Princeton, NJ, Mar. 21–24, 1995, pp. 80–84.

Liddy, Elizabeth et al., "A Natural Language Text Retrieval System With Relevance Feedback," *Proceedings of the 16th National Online Meeting*, May 2–6, 1995, pp. 259–261.

Liddy, Elizabeth D., "The Promise of Natural Language Processing for Competitive Intelligence," *Proceedings of 10th International Conference of the Society of Competitive Intelligence Professionals*, May 4–5, 1995, pp. 328–342.

Paik, Woojin et al., "Interpretation of Proper Nouns for Information Retrieval," *Proceedings of the ARPA Workshop on Human Language Technology*, Princeton, NY, Mar. 21–24, 1993, pp. 1–5.

Paik, Woojin et al., "Categorizing and Standardizing Proper Nouns for Efficient Information Retrieval," *Corpus Processing for Lexicon Acquisition*, MIT Press, Cambridge, MA, 1995 (Boguraev, B. (ed)) pp. 1–10.

Paik, Woojin, Chronological Information Extraction System (CIES), *Proceedings of the Dagstuhl on Summarizing Text for Intelligent Communication*, Saarbruken, Germany, 1995, pp. 1–5.

Weiner, Michael L. et al., "Intelligent Text Processing, and Intelligence Tradecraft," *The Journal of Association for Global Strategic Intelligence (AGSI)*, Jul. 1995, pp. 1–8.

FIG. 16

NATURAL LANGUAGE INFORMATION RETRIEVAL SYSTEM AND METHOD

CROSS-REFERENCE TO RELATED APPLICATIONS

This application claims priority from, and is a continuation-in-part of, the following U.S. Provisional Patent Applications, all filed Aug. 16, 1995, the disclosures of which are hereby incorporated by reference:

1. Ser. No. 60/002,451, of Elizabeth D. Liddy, entitled THE PROMISE OF NATURAL LANGUAGE PROCESSING FOR COMPETITIVE INTELLIGENCE;
2. Ser. No. 60/002,452, of Elizabeth D. Liddy and Sung H. Myaeng, entitled DR-LINK SYSTEM: PHASE I SUMMARY;
3. Ser. No. 60/002,453, of Elizabeth D. Liddy, Edmund S. Yu, Mary McKenna, and Ming Li, entitled DETECTION, GENERATION AND EXPANSION OF COMPLEX NOMINALS;
4. Ser. No. 60/002,470, of Elizabeth D. Liddy, Woojin Paik, and Mary McKenna, entitled DEVELOPMENT OF A DISCOURSE MODEL FOR NEWSPAPERS;
5. Ser. No. 60/002,471, of Elizabeth D. Liddy, Woojin Paik, Edmund S. Yu, E. S. and Mary McKenna, entitled DOCUMENT RETRIEVAL USING LINGUISTIC KNOWLEDGE; and
6. Ser. No. 60/002,472, of Woojin Paik, Elizabeth D. Liddy, Edmund Yu, and Mary McKenna, entitled CATEGORIZING AND STANDARDIZING PROPER NOUNS FOR EFFICIENT INFORMATION RETRIEVAL.

GOVERNMENT RIGHTS

The U.S. Government has rights in this invention pursuant to Contract No. 91-F136100-000, awarded by the Office of Research and Development.

The following applications, including this one, are being filed concurrently, and the disclosure of each other application is incorporated by reference into this application:

U.S. patent application Ser. No. 08/696,701, entitled "MULTILINGUAL DOCUMENT RETRIEVAL SYSTEM AND METHOD USING SEMANTIC VECTOR MATCHING," to Elizabeth D. Liddy, Woojin Paik, Edmund S. Yu, and Ming Li;

U.S. patent application Ser. No. 08/698,472, entitled "NATURAL LANGUAGE INFORMATION RETRIEVAL SYSTEM AND METHOD," to Elizabeth D. Liddy, Woojin Paik, Mary McKenna, and Ming Li; and U.S. patent application Ser. No. 08/676,702, entitled "USER INTERFACE AND OTHER ENHANCEMENTS FOR NATURAL LANGUAGE INFORMATION RETRIEVAL SYSTEM AND METHOD," to Elizabeth D. Liddy, Woojin Paik, Mary McKenna, Michael Weiner, Edmund S. Yu, Ted Diamond, Bhaskaran Balakrishan, and David Snyder

BACKGROUND OF THE INVENTION

The present invention relates generally to the field of computer-based information retrieval, and more specifically to the application of natural language processing (NLP) techniques to the interpretation and representation of computer text files, and to the matching of natural language queries to documents with the aid of user interactions.

Computer-based information retrieval is now an established industry serving many professional communities. Retrieval technologies used in this industry share many common features. For example, a user of these systems is typically required to either (1) state an information need, or query, in a circumscribed manner, usually by demarcing the logical requirements of the query as a sequence of terms linked by various operators, or (2) write the query as free-form text, which is then parsed automatically into a sequence of words or phrases, without regard for the logical form of the query or the underlying meaning of the query. In either event the query is represented only by the collection of words that are overtly stated in the query text (or limited stemmed forms of some words, such as plurals). The matching of documents to a query is based on the co-occurrence of these words or phrases.

A second commonality among retrieval systems is that a query representation derived from a user's query statement is automatically formed by the computer system, with limited or no interaction with the user. In most retrieval systems, once an initial query statement has been made in full, the computer system interprets the contents of the query without allowing the user to verify, clarify or expand upon query representations created by the computerized retrieval system. In the same fashion, the subsequent display of retrieved documents is largely under computer control, with little user interaction.

In view of these common characteristics of computer-based retrieval systems, their inability to capture both the preciseness and richness of meaning in queries and documents, and their inability to interact with the user to help formulate a query statement and present retrieved documents, retrieval is often an inexact process.

SUMMARY OF THE INVENTION

The present invention provides techniques for generating sophisticated representations of the contents of both queries and documents in a retrieval system by using natural language processing (NLP) techniques to represent, index, and retrieve texts at the multiple levels (e.g., the morphological, lexical, syntactic, semantic, discourse, and pragmatic levels) at which humans construe meaning in writing. The invention also offers the user the ability to interact with the system to confirm and refine the system's interpretation of the query content, both at an initial query processing step and after query matching has occurred.

According to one aspect of the invention, the user enters a query, possibly a natural language query, and the system processes the query to generate an alternative representation. This alternative representation may include conceptual-level abstraction and enrichment of the query, and may include other representations. In a specific embodiment, the conceptual-level representation is a subject field code vector, while the other representations include one or more of representations based on complex nominals (CNs), proper nouns (PNs), single terms, text structure, and logical make-up of the query, including mandatory terms. The query representation is matched to the relevant document database, and measures of relevance generated for the documents. The documents in the database have preferably been processed to provide corresponding alternative representations for matching to queries.

According to a further aspect of the invention, a natural language query is processed to generate a logical representation of terms in the query. The system recognizes words that indicate negation, and divides the terms in the query as to whether such terms belong to the positive or negative portion of the query. In recognition of the fact that a document dealing with the negative portion of the query may contain information relevant to the positive portion, the system is designed to incorporate the terms in the negative portion of the query into the alternative representation of the query. However, in further recognition that the user explicitly specified certain types of subject matter as not being of interest, documents satisfying both the positive and negative portions of the query are segregated from documents meeting only the positive portion of the query.

According to a further aspect of the invention, a natural language query is processed to generate a logical representation of terms in the query. The system recognizes words that indicate a mandatory requirement of the query, and the presence of mandatory terms in a document can be given greater weight in matching. Whether or not the presence of mandatory terms enters into the score, documents containing the mandatory terms are identified and preferably segregated from documents that do not contain all the mandatory terms.

According to a further aspect of the invention, texts (documents and queries) are processed to determine discourse aspects of the text beyond the subject matter of the text. This text structure includes temporal information (past, present, and future), and intention information (e.g., analysis, prediction, cause/effect). Thus the invention is able to detect the higher order abstractions that exist in human communications that are above the word level, such as the difference between a statement describing an expected outcome, the consequence of a particular event (prediction), or a statement that described a past event. Since the system is able to recognize the manifold intentions in a query, it can operate on a greater scope of documents and data without the user having to pre-specify where one suspects the answers (documents) might be.

The sophistication of the text representation used in the invention means that certain discourse that exophorically references tables, graphs, photographs or other images can also be used to search with great efficiency for such images. For example, the captions used to label photographs has a certain discourse structure, and this structure can be used to help effectively search for graphic items.

According to a further aspect of the invention, the system automatically sorts, ranks and displays documents judged relevant to the content of the query, using a multi-tier system of folders containing ranked lists of documents. The inclusion of a document and its position within a folder are typically determined by a relevance score based on the various elements of the alternative representation. However, the user can modify both the viewing order and the sorting order based on one or more of the following: conceptual level subject content codes; the presence or absence of various proper nouns, including personal names, company names, countries, cities, titles, etc.; the presence or absence of various terms or phrases; the text structure of the document, such as the time frame, or the presence of various requirements such as analytic information, cause/effect dimension, predictions, etc.; the presence or absence of negated expressions; the document date or range of dates; the document source; the document author; the document language; and a similarity score criterion for the document.

A further understanding of the nature and advantages of the present invention may be realized by reference to the remaining portions of the specification and the drawings.

BRIEF DESCRIPTION OF THE DRAWINGS

FIG. 16 is the retrieved documents view screen (foldered by subject field code);

DESCRIPTION OF SPECIFIC EMBODIMENTS 1.0 Introduction

This application describes a computer system used for information retrieval that, through a sequence of computer and user interactions, allows the expression and clarification of complex query statements and the retrieval and display of relevant documents using natural language processing (NLP) techniques. The system incorporates aspects described in a paper by Liddy et al. [Liddy94a]. The system is referred to in the paper as DR-LINK (Document Retrieval using Linguistic Knowledge), and will also sometimes be referred to as DR-LINK in this application.

This application is divided into two parts. In the first part, a detailed description is given of the underlying software processing that facilitates NLP-based text retrieval. In the second part, a description is given of the graphic user interface (GUI) and the sequence of interactions that occur between the software processing system and the user.

Unless otherwise stated, the term "document" should be taken to mean text, a unit of which is selected for analysis, and to include an entire document, or any portion thereof, such as a title, an abstract, or one or more clauses, sentences, or paragraphs. A document will typically be a member of a document database, referred to as a corpus, containing a large number of documents. Such a corpus can contain documents in any or all of the plurality of supported languages.

Unless otherwise stated, the term "query" should be taken to mean text that is input for the purpose of selecting a subset of documents from a document database. While most queries entered by a user tend to be short compared to most documents stored in the database, this should not be assumed. The present invention is designed to allow natural language queries.

Unless otherwise stated, the term "word" should be taken to include single words, compound words, phrases, and other multi-word constructs. Furthermore, the terms "word" and "term" are often used interchangeably. Terms and words include, for example, nouns, proper nouns, complex nominals, noun phrases, verbs, adverbs, numeric expressions, and adjectives. This includes stemmed and non-stemmed forms.

The disclosures of all articles and references, including patent documents, mentioned in this application are incorporated herein by reference as if set out in full.

1.1 System Hardware Overview

Figure 1:
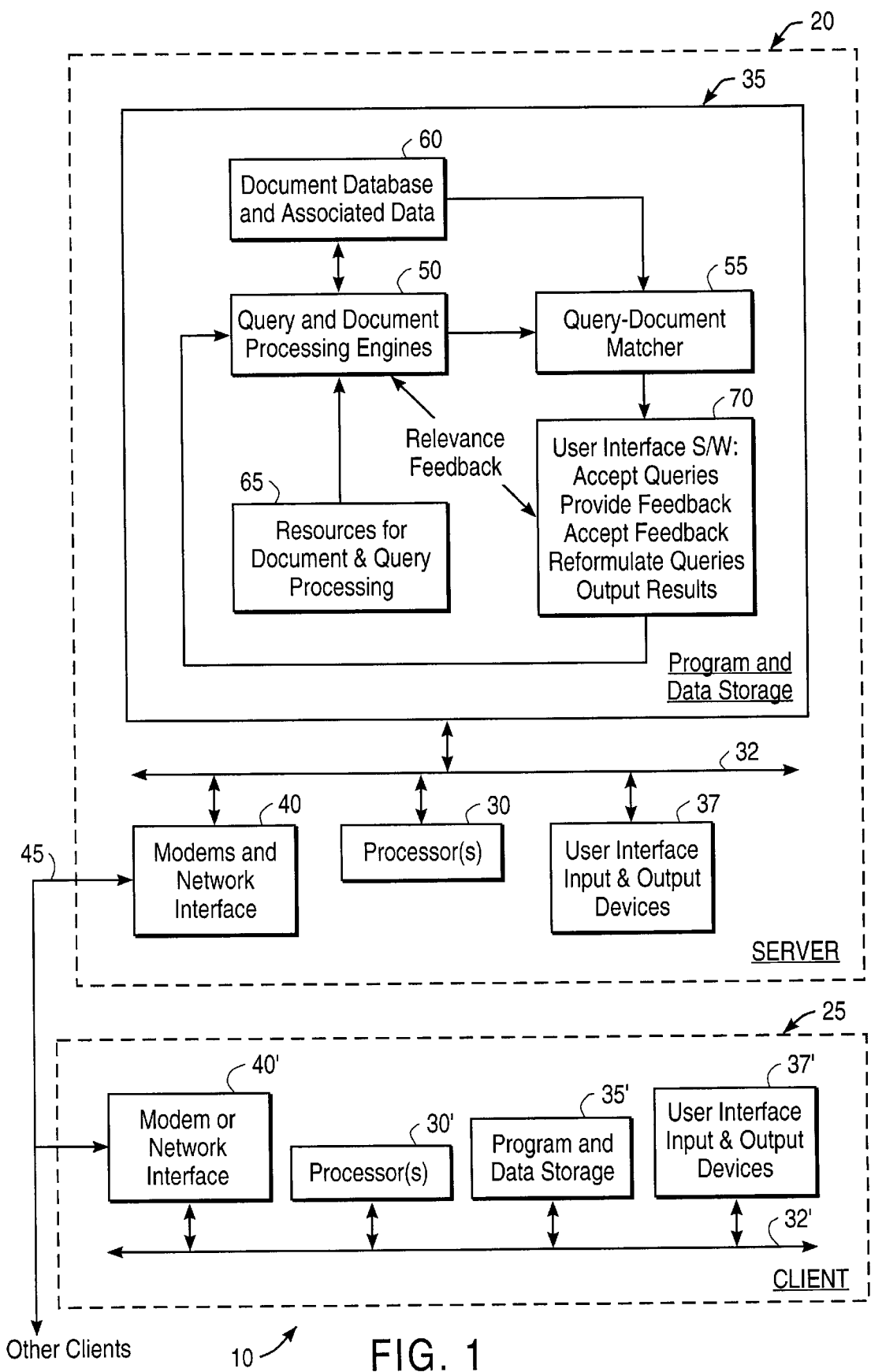
FIG. 1 is a block diagram of an information retrieval system embodying the present invention.

FIG. 1 is a simplified block diagram of a computer system 10 embodying the text retrieval system of the present invention. The invention is typically implemented in a client-server configuration including a server 20 and numerous clients, one of which is shown at 25. The use of the term "server" is used in the context of the invention, where the server receives queries from (typically remote) clients, does substantially all the processing necessary to formulate responses to the queries, and provides these responses to the clients. However, server 20 may itself act in the capacity of a client when it accesses remote databases located on a database server. Furthermore, while a client-server configuration is known, the invention may be implemented as a standalone facility, in which case client 25 would be absent from the figure.

The hardware configurations are in general standard, and will be described only briefly. In accordance with known practice, server 20 includes one or more processors 30 that communicate with a number of peripheral devices via a bus subsystem 32. These peripheral devices typically include a storage subsystem 35 (memory subsystem and file storage subsystem), a set of user interface input and output devices 37, and an interface to outside networks, including the public switched telephone network. This interface is shown schematically as a "Modems and Network Interface" block 40, and is coupled to corresponding interface devices in client computers via a network connection 45.

Client 25 has the same general configuration, although typically with less storage and processing capability. Thus, while the client computer could be a terminal or a low-end personal computer, the server computer would generally need to be a high-end workstation or mainframe. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using user interface devices 37' (or devices 37 in a standalone system). For example, client queries are entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

1.2 Text Processing (Software) Overview

The server's storage subsystem 35, as shown in FIG. 1, maintains the basic programming and data constructs that provide the functionality of the DR-LINK system. DR-LINK software is designed to (1) process text stored in digital form (documents) or entered in digital form on a computer terminal (queries) to create a database file recording the manifold contents of the text, and (2) match discrete texts (documents) to the requirements of a user's query text.

DR-LINK provides rich, deep processing of text by representing and matching documents and queries at the lexical, syntactic, semantic and discourse levels, not simply by detecting the co-occurrence of words or phrases. Users of the system are able to enter queries as fully-formed sentences, with no requirement for special coding, annotation or the use of logical operators.

The system is modular and performs staged processing of documents, with each module adding a meaningful annotation to the text. For matching, a query undergoes analogous processing to determine the requirements for document matching. The system generates both conceptual and term-based representations of the documents and queries. It is convenient to refer to the collection of various representations which the system produces for each document or for each query as "the alternative representation" for that document or query. Put another way, a reference to "the alternative representation," should be taken to encompass a single representation, or any or all of the plurality of representations.

The processing modules include a set of processing engines, shown collectively in a processing engine block 50, and a query-document matcher 55. It should be understood, however, that by the time a user is entering queries into the system, the relevant document databases will have been processed and annotated, and various data files and data constructs will have been established. These are shown schematically as a "Document Database and Associated Data" block 60, referred to collectively below as the document database. An additional set of resources 65, possibly including some derived from the corpus at large, is used by the processing engines in connection with processing the documents and queries. Alternatively, documents can be processed and annotated on the fly as they arrive in real time.

User interface software 70 allows the user to interact with the system. The user interface software is responsible for accepting queries, which it provides to processing engine 50. The user interface software also provides feedback to the user regarding the system's interpretation of the query, and accepts responsive feedback from the user in order to reformulate the query. The user interface software also presents the retrieved documents as a result of the query to the user and reformats the output in response to user input. User interface software 70 is preferably implemented as a graphical user interface (GUI), and will often be referred to as the GUI.

1.3 GUI Interaction Overview

Figure 2:
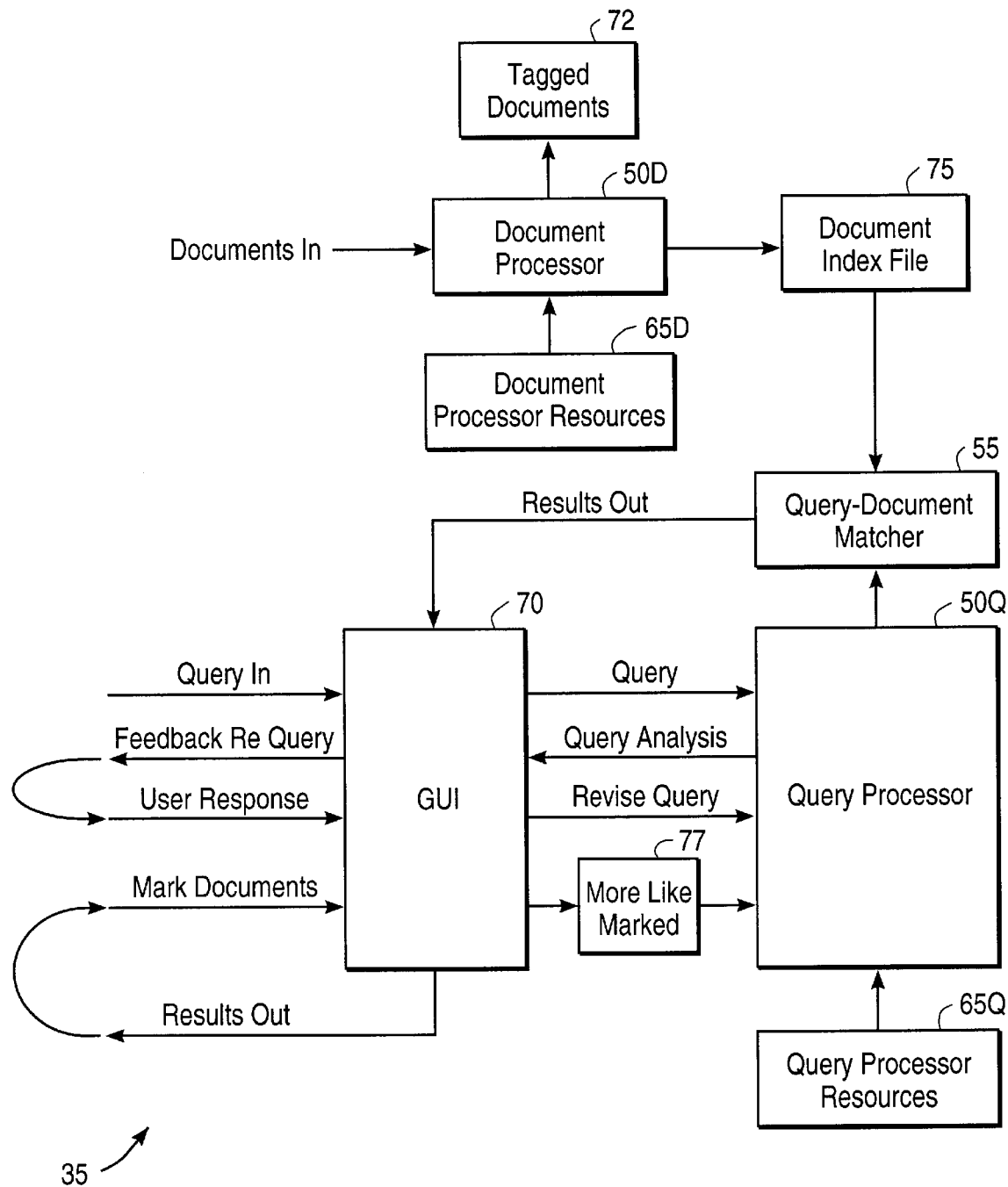
FIG. 2 is a more detailed block diagram of the interactions between the user and the system during text processing portion for information retrieval.

FIG. 2 is a more detailed block diagram of the text processing portion of the system, showing the nature of the interactions between the user and the system. In the figure, processing engine block 50 has been broken into document processing engines 50D, collectively referred to as the document processor, and query processing engines 50Q, collectively referred to as the query processor (QP). Each has its own resources, shown as document processor resources 65D and query processor resources 65Q. It should be understood that some of the resources can be shared resources.

GUI 70 is shown as a single block with inputs and outputs, as well as links to matcher 55, QP 50Q, and an additional module 77, called "More Like Marked" (MLM). As well as providing exceptionally rich and powerful document and query representations, user interface enhancements allow the user to interact with the retrieval process.

Documents are shown as being input to document processor 50D, which outputs a set of tagged documents 72 and a document index file 75, which stores alternative representations of the documents for use by matcher 55. Similarly, queries are shown as being input to GUI 70, and communicated to query processor 50Q, which generates an alternative representation of the query for use by the matcher. As noted above, and will be described in detail below, the alternative representation for a document or a query typically includes several different types of information that the system has generated based on the content of the document or query.

Matcher 55 executes the query by comparing the query representation to the document representations, and provides results to GUI 70 for display and other action. However, before the query representation is sent to the matcher, results of the query processing (indicating the query representation) are displayed for the user. This provides the user an opportunity to provide input specifying modification of the query representation. This user feedback is shown schematically as a semi-elliptical arrow in the figure. QP 50Q modifies the query representation accordingly before sending the query representation to matcher 55.

Once the query, possibly modified, is executed, the search results are displayed to the user. The user is then able to provide feedback to the system by marking documents that are considered particularly relevant. The representations of these documents are then used by MLM module 77 to create a further revised query for execution. This feedback based on document relevance is referred to as relevance feedback.

2.0 Document Processing 2.1 Document Processing Overview

Figure 3:
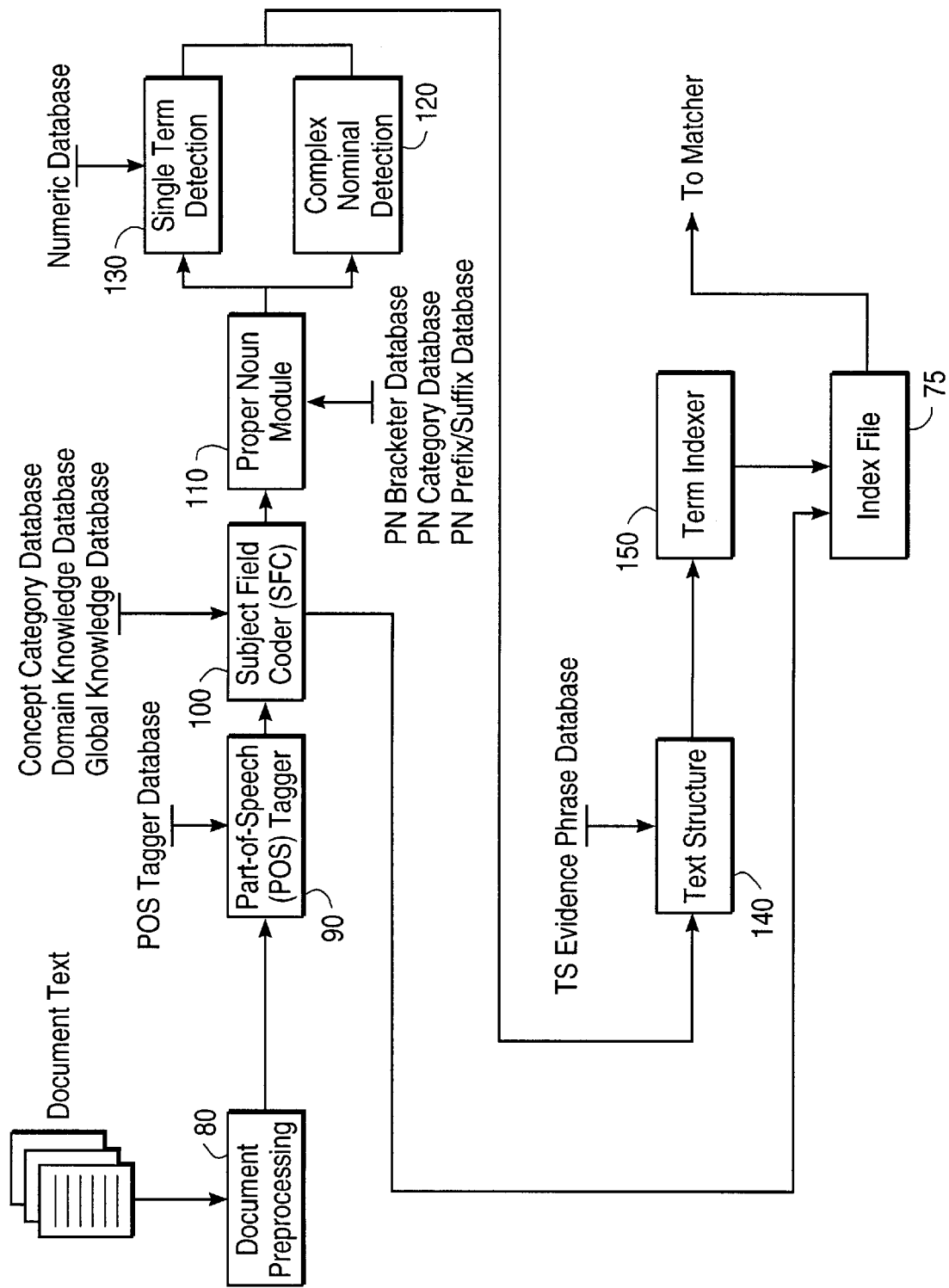
FIG. 3 is a block diagram of the document processing portion of the system.

FIG. 3 is a block diagram showing the document processing modules within document processor 50D, and some associated resources. The set of modules that perform the processing to generate the conceptual representation and the term-based representation of each document includes:

a preprocessor 80;

a part of speech (POS) tagger 90, with its associated POS, end of sentence detection, and lexical clue databases;

a subject field coder (SFC) 100, with its associated concept category database containing a hierarchy of concept categories for all words, domain knowledge concept category correlation matrix database used to disambiguate concept categories at the domain level, and global knowledge concept category sense-frequency database used to disambiguate concept categories at the global level;

a proper noun (PN) categorizer (PNC) 110, with its associated proper noun bracketer database used to bracket PNs with embedded conjunctions and/or prepositions, proper noun category databases used to categorize PNs, proper noun prefix/suffix database used to identify PN categories by reference to the suffix or prefix, and proper noun clarification database which presents alternative proper names based on what user has typed in the query;

a complex nominal (CN) detector 120, single term detector 130, with its associated numeric information database used to identify and catalog numeric data types (currency, temperature, etc.);

a text structurer 140, with its associated text structure evidence phrase database used to gather evidence for a particular text structure; and a term indexer 150.

In the course of operation, SFC 100 and term indexer 150 write document information into database index file 75, which as mentioned above, is used for query matching.

2.2 Document Preprocessor 80

Document preprocessor 80 transforms raw digital data files of text into a uniform format suitable for further processing by the DR-LINK system. Preprocessing involves some discourse-level manipulation of text, such as the explicit decomposition of composite documents into appropriate sub-texts. All text is annotated with pseudo-SGML tags. Preprocessing tags include, but are not limited to, fields such as <caption>, <date>, <headline>, <sub-text headline>, and <sub-text>, <FIG.> and <table>. The preprocessor further identifies various fields, clauses, parts-of-speech and punctuation in a text, and annotates a document with identifying tags for these units. The identification process occurs at the sentence, paragraph and discourse levels and is a fundamental precursor to later natural language processing and document-query matching.

2.3 Part-of-Speech (POS) Tagger 90

In a current implementation, documents are first processed using a custom End-of-Sentence detection program, followed by a commercial off-the-shelf (COTS) probabilistic part-of-speech (POS) tagger of the type provided by such companies as Inso Corporation, Boston, Mass. The POS tagger identifies over 47 grammatical forms and punctuation marks. In addition, hyphenated words are often given multiple tags—each constituent word is given a tag, and the whole hyphenated phrase is given a tag. The preferred implementation performs additional processing of text, numerals, and other markings and attributes beyond that of the commercial POS tagger (see discussion of additional modules below).

2.4 Subject Field Coder (SFC) 100

Using the text output from the POS tagger, the SFC 100 tags content-bearing words in a text with a disambiguated subject code using an online lexical resource of words whose senses are grouped in subject categories. This is described in detail in copending U.S. patent application Ser. No. 08/135,815, filed Oct. 12, 1993, entitled "Natural Language Processing System For Semantic Vector Representation Which Accounts For Lexical Ambiguity," to Elizabeth D. Liddy, Woojin Paik, and Edmund Szu-Li Yu. The application mentioned immediately above, hereinafter referred to as "Natural Language Processing," is hereby incorporated by reference for all purposes.

A subject field code indicates the conceptual-level sense or meaning of a word or phrase. The current implementation, with 680 hierarchically arranged sub-categories, offers sufficient resolution without too much diffusion of the codes. The present invention, however, is not limited to a specific hierarchical arrangement or a certain number of subject field codes.

Each information bearing word in a text is looked up in the online, lexical resource. If the word is in the lexicon, it is assigned a single, unambiguous subject code using, if necessary, a process of disambiguation. Once each content-bearing word in a text has been assigned a single SFC, the frequencies of the codes for all words in the document are combined to produce a fixed length, subject-based vector representation of the document's contents. This relatively high-level, conceptual representation of documents and queries is an important representation of texts used for later matching and ranking.

Polysemy (the ability of a word to have multiple meanings) is a significant problem in information retrieval. Since words in the English language have, on average, about 1.49 senses, with the most commonly occurring nouns having an average of 7.3 senses, and the most commonly occurring verbs having an average of 12.4 senses [Gentner81], a process of disambiguation is involved in assigning a single subject field code to a word.

Words with multiple meanings (and hence multiple possible subject field code assignments) are disambiguated to a single subject field code using three evidence sources (this method of disambiguation has general application in other text processing modules to help improve performance):

2.4.1 Local Context. If a word in a sentence has a single subject code tag, it is Unique. If there are any subject codes that have been assigned to more than a pre-determined number of words in a sentence, then the codes are Frequent Codes. These two types of codes are used as anchors to disambiguate the remaining words in a sentence that share the same codes.

2.4.2 Domain Knowledge. Certain subject codes are highly correlated with other codes within a given domain. This strong association is used to disambiguate polysemous words that cannot be disambiguated using local context.

2.4.3 Global Knowledge. If words cannot be disambiguated in steps 1 or 2, then the most frequently used sense of a word is invoked.

The fixed-length vector representation of the subject contents of a text is stored in database index file 75 along with other index representation of the text.

2.5 Proper Noun Detector and Categorizer (PNC) 110

Proper nouns, group proper nouns (e.g., the Far East) and group common nouns (e.g., anti-cancer drugs) are recognized as important sources of information for detecting relevant documents in information retrieval [Paik93a]. PNC 110 first locates the boundaries of proper noun phrases using the POS tags mentioned earlier, and other text analysis tools. Heuristics developed through corpus analysis are applied to bracket proper noun phrases which contain embedded conjunctions and prepositions (e.g., Department of Defense, Centers for Disease Control and Prevention).

PN categorization is the process whereby a proper noun is assigned to a single category rather like the concept categories used in SFC 100. Categories include city, state, country, company, person, etc. The current DR-LINK proper noun classification scheme is expanded and modified from earlier attempts, and over 40 concept categories, which in tests correctly account for over 89% of all proper nouns, with the remainder being classified as "miscellaneous." This invention is not dependent on a specific number of concept categories or a specific arrangement of categories.

The proper noun classification scheme is based on algorithmic machine-aided corpus analysis. In a specific implementation, the classification is hierarchical, consisting of branch nodes and terminal nodes, but this particular hierarchical arrangement of codes is but one of many arrangements that would be suitable.

Table 1 shows a representative set of proper noun concept categories and subcategories.

TABLE 1

| Proper Noun Categories and Subcategories |
|---|
| Geographic Entity: |
| City |
| Port |
| Airport |
| Island |
| County |
| Province |
| Country |
| Continent |

TABLE 1-continued

Proper Noun Categories and Subcategories

Region
Water
Geographic Miscellaneous
Affiliation:

Religion
Nationality
Organization:

Company
Company Type
Sports Franchise
Government
U.S. Government
Education/Arts Services
Political Organization
Religious Organization
Human:

Person
Title
Document:

Periodicals/Books
Treaties/Laws/Acts
Epuipment:

Software
Hardware
Machines
Scientific:

Disease
Drugs
Chemicals
Organic Matter
Temporal:

Date
Time
Holiday
Miscellaneous:

Miscellaneous

Classification occurs in the following sequence:

2.5.1 Proper noun suffixes, prefixes and infixes (e.g., Hospital, Senator, Professor) are examined for possible categorization information.

2.5.2 The proper noun is passed to a database to determine if an alternative, standard form exists (e.g., President Bill Clinton for Bill Clinton). If the proper noun is an alias, the standard form is used for categorization.

2.5.3 The proper noun is next run through context heuristic tests for possible categorization. Text-based clues are used for categorization. For example, if the proper noun is immediately followed by a comma and a state, county, or country name, then the proper noun is identified as a town, city or other geographic entity. Appositional phrases (noun phrases found in close proximity to proper nouns, usually revealing identifying information about the proper named entity) will also be detected and used in the categorization process. Numerous other heuristics are applied until the proper noun has been tested for inclusion in one of several categories.

2.5.4 Proper names are compared to a database of significant personal first names for a possible match (e.g., such as a database collection of names in electronic phone directories, sorted by frequency, or by the proper nouns found in the databases searched). An array of knowledge databases are used. New names and associations are constantly added and updated.

2.5.5 Those proper nouns that remain uncategorized are assigned to the "miscellaneous" category: in tests fewer than 11% of proper nouns are so assigned [Paik93a], [Paik93b].

2.5.6 Once identified, proper nouns can be expanded to include other synonymous proper nouns. For group proper nouns (Europe, Fortune 500 companies), the group proper noun is expanded to include all member proper nouns (e.g., Germany and France, IBM and General Electric).

2.6 Complex Nominal (CN) Detector 120

Complex nominals (e.g., budget amendment bill, central nervous system) are important information-bearing phrases detected by the DR-LINK system and used in the document-query matching process. CN phrases are recognizable as adjacent noun pairs or sequences of non-predicating and predicating adjective(s) and noun(s). These pairs or sequences can be recognized from the output of the POS-tagged text in conjunction with various unique processing tools developed from corpus analysis. In addition, CN phrases are recombined, or parsed, whereby meaningful complex nominal word combinations are extracted and indexed. For example, the CN "Information Retrieval System" would be recombined to yield "Information Retrieval," "Retrieval System," and "Information System." A synonymous phrase might be "Text Processing Software." Later matching algorithms weight these terms based on the assumption that a whole CN is a better, more specific indicator of the document's contents than the recombined constituent words.

2.7 Single Term Detector 130

The detection of CNs and PNs alone would not account for all of the information-rich content of typical English-language texts. Some nouns, conflated nouns (e.g., inkwell), verbs, adverbs and adjectives also contain important information about the subject-contents of documents, and are detected by the single term detector. Numbers and numerically-related information (e.g., "$" and other currency symbols) are also recognized.

2.8 Text Structurer 140

Text structurer 140 provides valuable information about the sense and meaning of a text [Liddy94c]. The text structurer is based on discourse theory [VanDijk88] which suggests that textual communication within a given community (journalism, law, medicine), or text of a certain genre (recipe, obituary, folk-tale) has a predictable schema. The schema serves as a reliable indication of how and where certain information endemic to a text-type will be displayed. The text structurer module produces an enriched representation of each text by computationally decomposing it into smaller, conceptually labeled components. The delineation of the discourse-level organization of document and query contents facilitates retrieval of those documents that convey the appropriate discourse semantics. For example, a query that displays an interest in evaluative information on a topic will be matched to documents based partly on the prevalence of evaluative comments on that topic within those documents.

Discourse theory and text structurer is founded in the observation that writers who repeatedly produce texts of a particular type are influenced by a somewhat rigid schema of the text type. That is, they consider not only the specific content they wish to convey but also various structural requirements (for a discussion of discourse theory and principles behind text structurer, see [Liddy93]).

In the current and preferred embodiment of text structurer, a departure from earlier implementations, various structural annotations (tags) are assigned based upon various evidence sources, including the presence and logical arrangement of clauses, phrases and combinations of words and punctuation. These structural tags express important aspects which can contribute to relevancy in a text, including time, opinion, and intention. The text structurer assigns these annotations or tags on the basis of (1) lexical clues or other linguistic evidence learned from a corpus of text, which now comprises a special lexicon, and (2) a regression formula that includes multiple evidence sources at the word, sentence, paragraph and document levels. For example, with newspaper discourse, the text structurer is able to annotate several components of information in a text, including factual information, analysis, and cause-and-effect.

In the current instantiation, text structurer treats queries as a unique discourse genre, and processing of queries is different to the processing of documents. In the general case, text structurer can be modified to accommodate many different discourse types, including newspaper texts, patent applications, legal opinions, scientific journal articles, and the like, each of which exhibits internally consistent discourse schemata. Different text processing can be applied to each. A discourse type or genre can be detected according to source information, author information, or other evidence.

The text structurer provides (1) temporal information about a text (past, present and future), and (2) information about the meta-contents or intention of the text (whether the text contains analysis, cause/effect information, predictions, quotations, or evaluative comments). Dependencies can exist between the assignment of temporal and intention-based tags.

Table 2 below shows the text structure tags used in a preferred implementation of text structurer 140.

TABLE 2

Text Structure Tags

| Tag | Description | Examples of Evidence Phrases |
|---|---|---|
| AN | Analysis or opinion of a person, action or event. | Advantages; Disadvantages; In anticipation of; Pro; Con. |
| CE | Cause and/or Effect Noted. | As a means of, Gives rise to; Designed to; Affects, Impacts; Repercussions. |
| CR | Credential. | Officer; Chief; Credential; Duties; Title. |
| ED | Editorial. | Editorial. |
| FA | Factual Information. | Number of; How many; The date of the highest; The least. |
| FU | An Action or Event that takes place in the Future. | Looking ahead to; Coming months; Emerging; Expected; Trends. |
| HL | Headline. | (From Text Preprocessing). |
| IN | Instructions. | Instructions; Directions; Method for; Ingredients; Steps in the process. |
| LP | Lead Paragraph. | First paragraph of a document. |
| OB | Obituary. | Obituary; Death notice; Died today. |
| OG | An Action or Event is Ongoing in the Present. | Over the months; Continuing; Daily; Trends. |
| PA | An Action or Event that took place in the Past (1 yr or more). | In the last few years; In the past; History; Ancient. |
| PR | An Action or Event that took place in the Recent Past (one week to 1 yr. ago). | Past few months; 1st. Quarter; Prior month; Recently. |
| QU | A Direct or Indirect Quote. | Statements by; Announces; Quoting; Testified. |
| ST | A Reference to Stock, Bond or other Financial Information. | Dow opened; Nikkei closed; Stock reports; Dividends, NYSE. |
| RV | Reviews of a Product, Service, or other entity. | Standards and specifications; Evaluate; Review; Test. |

This list is not exhaustive and not all tags are necessary. The table also shows various sample evidence phrases used to help identify possible tag positions and assignments. For example, the "AN" "analysis or opinion tag uses evidence phrases such as "advantage.," "disadvantage," and "in anticipation of," along with other lexical and grammatical clues.

2.8.1 Assigning Tags.

In the general case, documents are tagged at the sentence level, with indexed annotations indicating the paragraph, position in paragraph, length of sentence, and number of paragraphs associated with the target text and the sentence concerned. A given sentence can have multiple tags. Terms in a given sentence are tagged according to all tags for that sentence, as described below in the text structurer module description. In the preferred implementation, tags are assigned to a sentence as follows, using a two-step process:

2.8.1.1 Document Aspects Vocabulary (DAV) database. The first step in assigning sentence-level tags to a document is to look up various identified evidence phrases (words, phrases, clauses, or collections of words and punctuation) in a Document Aspects Vocabulary (DAV) database. The DAV database contains a collection of evidence phrases (which can be phrases, clauses, sequences of words and punctuation, or a single word) that, taken alone or in a logically arranged sequence, suggest various intentions or temporal information in text.

2.8.1.2 Aspects Probability Matrix (APM) database. In the second stage, tag scores are assigned to various evidence phrases according to probability scores assigned to a matrix of all identified evidence phrases. Based on an extensive corpus analysis of documents typical of a given discourse type, evidence phrases are assigned probability scores for any and all text structurer tags, based on the probability of that evidence phrase being included within a given text structurer.

Table 3 shows an example of the database structure for the APM database.

TABLE 3

Structure for Aspects Probability Matrix (APM) database

| Evidence Phrase | AN Tag | EV Tag | CE Tag | FA Tag |
|---|---|---|---|---|
| Phrase #1 | 0.811 | 0.100 | 0.000 | 0.005 |
| Phrase #2 | 0.100 | 0.144 | 0.337 | 0.107 |
| Phrase #3 | 0.000 | 0.000 | 0.567 | 0.122 |

The table shows the matrix of evidence phrases and text structurer tags, with each cell in the matrix containing the given probability value. A probability value is calculated based on the number of occurrences of that evidence phrase within a given text structure component, as a fraction of all occurrences of that evidence phrase in the test corpus. The probability values are normalized to account for the different distributions of the various text structure tags in the training data.

In addition to text structurer tags assigned using DAV database evidence, the following method is used to assign text structurer tags at the sentence or clause level using the APM database and other evidence. This method is as follows:

2.8.1.3 All evidence phrases in a sentence are analyzed using the APM database for all text structurer tags. A summed score for all tags is produced using a Dempster-Schaffer formula, or similar formula. This score is used as an independent variable in a logistic regression equation described below.

(a) The same score as above is generated, except the summation does not use a Dempster-Schaffer formula.

(b) The following evidence sources are calculated: number of words in the sentence under consideration; the number of paragraphs in the document under consideration; the number of sentences in the paragraph under consideration; the relative position of the sentence with reference to the paragraph under consideration; and the relative position of the sentence in regard to the document under consideration.

(c) The evidence sources in the first three paragraphs above are used in a logistic regression equation, least squares fit, separately for each of the tag assignments. Coefficients for each of the 7 terms in the regression formula are computed using training data for specific discourse types or genres. The output at this stage of processing is a score, normalized between 0 and 1, for each of the text structurer tags. The score represents the likelihood that a given text structurer tag should be assigned to a given sentence in a document.

(d) For each text structurer tag, a minimum threshold value is assigned for the logistic regression, such that a tag is only assigned to a sentence (or clause) if the regression value exceeds this pre-determined threshold value. The threshold value for each tag is calculated based on extensive corpus analysis using training data.

2.8.2 Generating Tags

In the preferred embodiment two methods are used to generate evidence phrases in texts (queries and documents). In the first method, the natural language processing abilities of the DR-LINK system are exploited to automatically detect information-bearing words, phrases or clauses. For example, POS tagger 90, PNC 110, and related processing elements of the DR-LINK system are automatically able to detect appositional phrases related to proper nouns, and these are used as evidence phrases. In the second method, all single words, adjacent words pairs, words triples, etc. are extracted in overlapping sequence from sentences and used as the units of analysis for constructing evidence phrases.

2.8.3 Indexing Text Structure

The text structure tags are automatically incorporated into the index representation of terms in a document.

Table 4 shows a specific implementation of the index term format.

TABLE 4

Term Record for Index

| 1. Index Term | 2. | 3. | 4. | 5. | 6. | 7. |
|---|---|---|---|---|---|---|
| Document retrieval | 25 | 3425 | 2 | FA/QU | 1/9 | 525 |
| Information retrieval | 19 | 3425 | 1 | FA | 1 | 131 |

As can be seen in the table, there are 7 fields in each term record, consisting of an index term 1, the number of documents in the database which have the index term 2, the document identification in which the index term occurs 3, number of occurrences of the index term in the document 4, text structurer tags which are assigned to the sentences in which the index term occur 5, logical paragraph identification in which the index term occur 6, and total number of indexed terms in the document 7.

The text structurer is used as a partial requirement for relevancy in the matching process. Stated briefly, in the query to document matching process, each query term is searched against document index terms. One of the metrics used for assigning relevance scores, called positive text structurer (PTS), requires that a match be based on the presence of query terms found within the correct text structurer component. More details on PTS-based matching is given in the later description of the matcher.

2.9 Term Indexer 150

Figure 4:
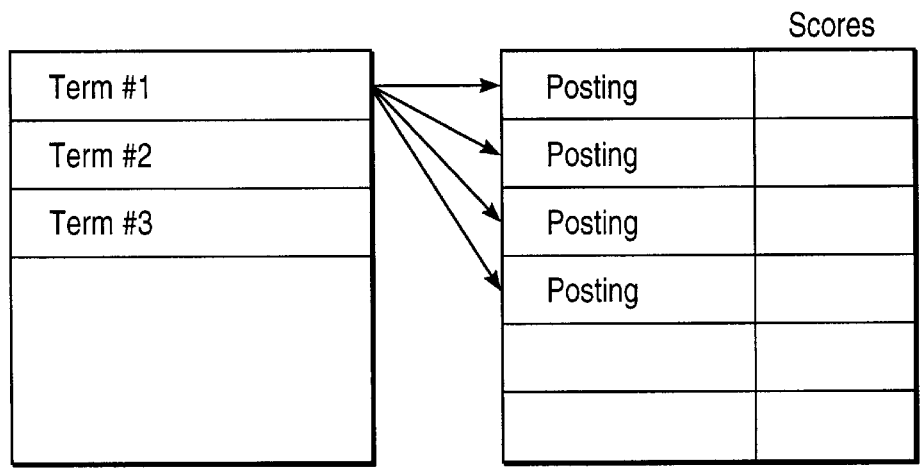
FIG. 4 shows the document indexing structure for terms.

Term indexer 150 indexes terms and SFC 100 indexes SFC vector data in related files, shown collectively as index file 75. Other document-based indexing is possible. The term index is a two-tier inverted file. The first level of the file contains terms, where a term can be a word (single term), a complex nominal, or a proper noun. The second level of the file contains postings (document references) with associated scores. The scores are an indication of the strength of the association between the term and the document. A single term will usually map to numerous postings, each with a score, as shown in FIG. 4. Terms are also indexed with reference to their location within the text (both as logical paragraphs and regarding text structure).

Indexing involves extracting terms from the text, checking for stop words, processing hyphenated words, then stemming all inflected terms to a standard form. Finally, for each document the within document Term Frequency (TF) is calculated; the product of TF and the Inverse Document Frequency (IDF) is used as the basis for the postings score—a measure of the relative prominence of a term compared to its occurrence throughout the corpora. TF.IDF scores are also cataloged for a varying number of logical paragraphs in a given document.

A logical paragraph is a subsection of a complete document, which may contain one or several text paragraphs, depending on the length of the overall document. Documents are divided into logical paragraphs based on size and natural transitions in a text, such as paragraph boundaries or subhead boundaries. Later matching can occur within a logical paragraph, so as to highlight the most relevant logical paragraph or the portion of a long document deemed most relevant to a query. While the preferred implementation uses the 16-unit logical paragraph arrangement described above, alternative implementations are possible. One such implementation is to divide the document into an unrestricted number of subsections that correspond to each and all of the natural paragraph boundaries in a text.

3.0 Query Processing 3.1 Query Processing Overview

Figure 5:
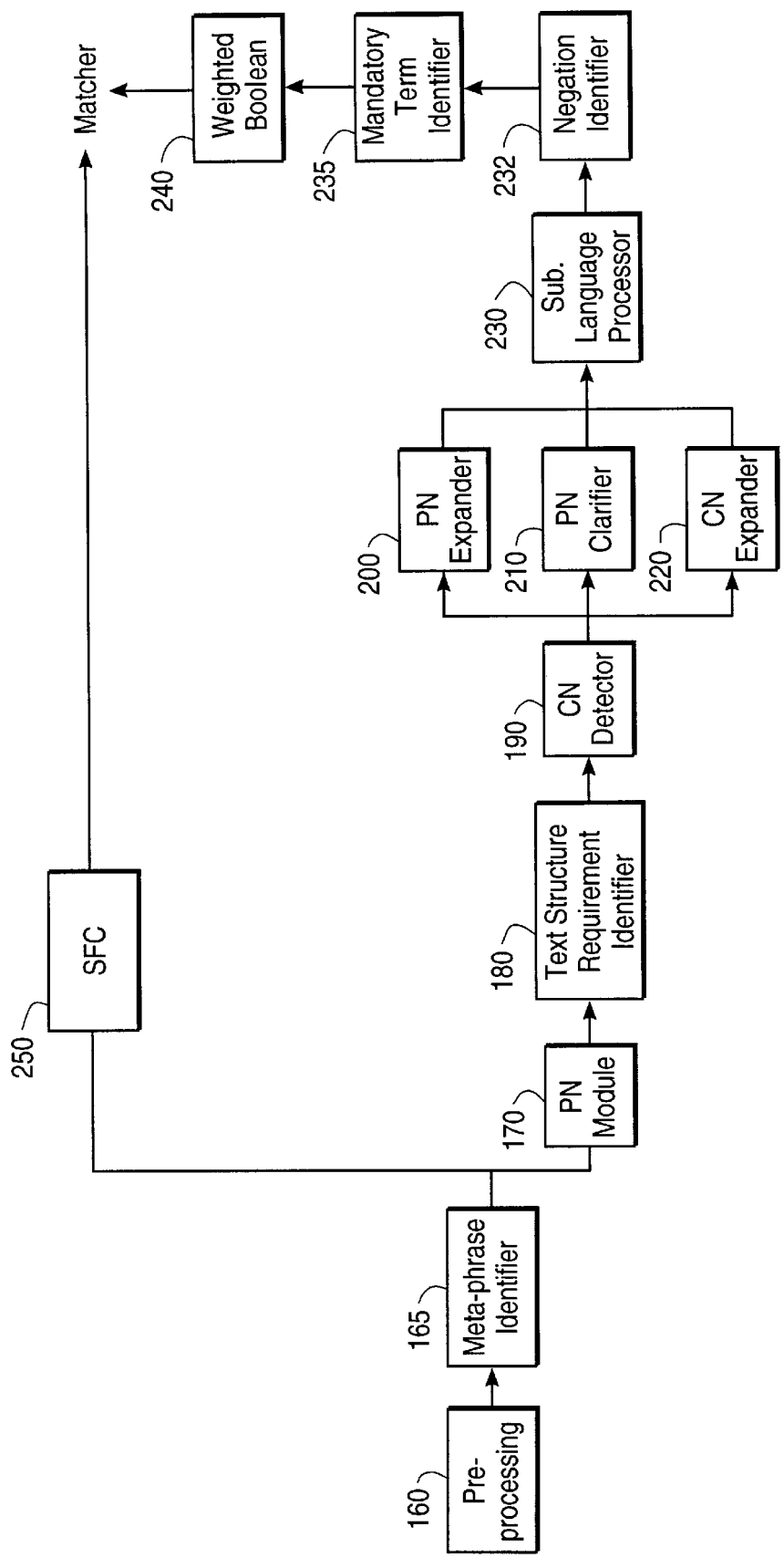
FIG. 5 a block diagram of the query processing portion of the system.

FIG. 5 is a block diagram showing the query processing modules within query processor (QP) 50Q. Queries are processed in a different manner to documents, although the evidence extracted from query text is very similar to the evidence extracted from document texts, and therefore some of the modules perform the same type of processing. The set of modules that perform the processing to generate the conceptual representation and the term-based representation of each query includes:

a preprocessor 160;

a meta-phrase identifier 165, with its associated meta-phrase evidence database used to identify meta-phrases in the query;

a proper noun (PN) categorizer (PNC) 170;

a text structure requirement identifier 180, with its associated text structure requirement database (similar to the text structure evidence phrase database, but for queries);

a complex nominal (CN) detector 190, a PN expander 200, with its associated PN expansion database used to find synonymous expansions for stated PNs;

a PN clarifier 210, with its associated PN clarification database;

a CN expander 220, with its associated CN expansion database used to find synonymous expansions for stated CNs;

a sublanguage processor 230, with its associated sublanguage processing database used to identify the logical form of the query;

a negation identifier 232, with its associated negation database used to identify negative portions in the query;

a mandatory term identifier 235, with its associated mandatory term database used to identify mandatory requirements stated in the query;

a weighted Boolean processor 240; and a subject field coder (SFC) 250.

3.2 Query Preprocessor 160

Query preprocessor 160 performs the same tasks for queries as preprocessor 80 performs for documents.

3.3 Meta-Phrase Identifier 165

Meta-phrase identifier 165 performs the task of detecting words or phrases in a query that are used to state (or expand upon) the query. For example, if a user asked: "I would like information about space ships, or any materials on lunar shuttles," using the meta lexicon, the phrases "I would like information about" and "any materials on" would be tagged as meta phrasing using an SGML marker. These words and phrases are then removed from the query processing stream, and are not used as search terms.

3.4 Proper Noun Categorizer (PNC) 170

PNC 170 performs the same task for queries as PNC 110 does for documents.

3.5 Text-Structure Requirement Identifier 180

Text-structure requirement identifier 180 performs a similar analysis of queries as text structurer 140 performs of documents. However, while the text structurer operates at the sentence level or on clause level, in the preferred embodiment, the text-structure requirement identifier operates upon the whole query. That is, the whole query is categorized by tense requirement (past, present future), and by intention requirement (prediction, analysis, facts, etc.). Thus an understanding is gained of the overall temporal and discourse aspect requirements of the query. An alternative implementation would assign tags at the individual sentence or clause level.

Text-structure requirement identifier codes are identical to the codes used in the text structurer. Similar heuristics are used to place text-structure requirement identifier codes, although variant lexical and discourse-level clues are employed in keeping with the variant structure of query statements. Codes are not mutually exclusive—any combination of requirements can be assigned to the same query.

For queries, the assignment of the text structurer tags is made using an extensive Question Aspect Vocabulary (QAB) database. The QAB database contains a collection of evidence phrases (which can be phrases, clauses, sequences of words and punctuation, or a single word) that, taken alone or in a logically arranged sequence, suggest various intentions or temporal information in text.

A complex of clues are used to establish tag assignments. The assignment of a tag may be based on the presence of a single evidence clue (single words, phrases, clauses, or sequences of words and punctuation) in a query, or upon a collection of such clues in a query. Alternatively, tag assignment may be based on the logical arrangement of evidence clues found in the QAB database, whereby evidence clues must appear (1) in a specified sequence, (2) connected logically, using operators such as AND, OR or NOT, or a combination of (1) and (2). In the preferred implementation, if no text structurer tag can be assigned using the QAB database evidence clues, then the default tag is Lead Paragraph (LP).

3.6 Complex Nominal (CN) Detector 190

The CN detection techniques for queries are the same as those used by CN detector 120 for documents.

3.7 Proper Noun (PN) Expander 200

PN expander 200 automatically provides the system user with synonyms, hyponyms, or member meronyms for proper nouns contained in the query. For example, if the user has asked for information about "Far East countries," the proper noun expander offers the user the following member meronyms for "Far East": Japan, South Korea, North Korea, Taiwan, and China. The user can decide whether or not to use these expanded terms in the query.

These expansion terms are entered into the proper noun expansion database by analyzing the corpus to find proper nouns which are related by the above exemplified semantic relations. In addition, proper noun expansion database entries can be entered manually using existing reference sources.

3.8 Proper Noun (PN) Clarifier 210

PN clarifier 210 automatically provides the system user with ambiguous interpretations for proper nouns contained in the query. For example, if the user has asked for information about "Clinton," the proper name clarifier offers the user the following possible interpretations for "Clinton": William Clinton, Hillary Clinton, David Clinton, and Robert Clinton. The user can decide or clarify whether or not to use certain interpretations of the proper nouns in the query.

These clarifiable terms are entered into the proper noun clarification database by automatically or manually creating possible variants of the proper nouns in the corpus and then creating a mapping table which consists of pairs of variants and the proper noun. Thus the above example shows the names of the people who all share the same last name. Thus, the term, "Clinton" needs to be clarified.

3.9 Complex Nominal (CN) Expander 220

CN expander 220 provides the system user with synonyms for phrases contained in their query. If the user has asked for information about "wealthy individuals emigrating from England," the complex nominal expander offers the user the following synonyms for "wealthy individual": rich person, wealthy person, rich individual, affluent individual, and affluent person. The user can decided whether or not to use these synonyms in the query.

To generate these synonyms, two methods are used. First, a CN database having a list of CN synonyms, based on corpus frequency of particular complex nominals, is consulted. If there is a match here, the synonyms from this CN database are used. If there is no match in the database, then automatic word substitution for each word in the CN is performed using an online single term CN database. Possible synonymous phrasings generated by this method are checked against corpora indices to confirm that the new construction does occur in some index. If the phrase does not occur in any index, it will be removed from the list of synonyms to be presented to the user.

3.10 Sublanguage Processor 230

Sublanguage processing is the beginning of a transition from a natural language query representation to a pseudo-logical representation of the query contents. In the preferred embodiment this is another heuristic system, but other approaches may be taken. The initial sublanguage processing of the query involves tokenization, standardization and the resolution of anaphoric references.

Part of this sublanguage is a limited anaphor resolution (that is, the recognition of a grammatical substitute, such as a pronoun or pro-verb, that refers back to a preceding word or group of words). An example of a simple anaphoric reference is shown below:

"I am interested in the stock market performance of IBM. I am also interested in the company's largest foreign shareholders."

In this example, the phrase "the company's" is an anaphoric reference back to "IBM." The QP module substitutes the referent (IBM) in anaphors before creating the logical representation.

After this initial processing, the natural language query is decomposed to an ensemble of logical or pseudo-logical assertions linking portions of the query, or various terms (or groups of terms). A series of operators are used to make these logical and pseudo-logical assertions. These operators relate terms and parts of the query text together, and also assign scores according to the formulas in Table 5 and as described below. Different operators assign different scores.

TABLE 5

Operators Used for Boolean Representation

| Operator | Operation | Fuzzy Weight/Score |
|---|---|---|
| AND | Boolean AND | Addition of scores from ANDed terms |
| OR | Boolean OR | Maximum score from all ORed terms |
| !NOT | Negation | — |
| #AND | Conditional AND | head term #AND tail term. If head term present, revert to AND, else 0 |
| *AND | Mandatory marker | query *AND mandatory. Used to separate mandatory elements for later foldering. Scores as AND. |
| =AND | Proximity AND | |

First, the Query Processor (QP) automatically constructs a logical representation of the natural language query. The user is not required to annotate the query in any way. A tree structure with terms connected by logical operators is constructed. Consider the example query below:

"I am interested in any information concerning A and B and C, D or E and F."

Figure 6:
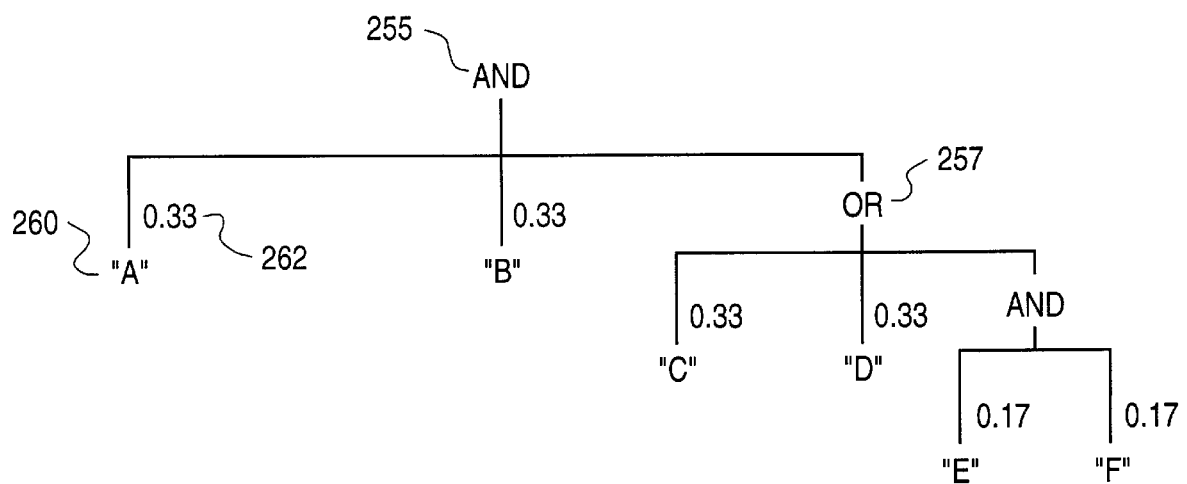
FIG. 6 is a tree-form logical representation of a query statement.

The tree representation of this query is shown in FIG. 6. Various linguistic clues such as lexical clues and punctuation are used to determine the logical form of the query: The basis of this system is a sublanguage grammar which is rooted in generalizations regarding the regularities exhibited in a large corpus of query statements.

The sublanguage relies on items such as function words (articles, auxiliaries, and prepositions), meta-text phrases, and punctuation (or the combination of these elements) to recognize and extract the formal logical combination of relevancy requirements from the query. In the very simple query stated above, the positions and relations of the preposition "concerning", the conjunctions "and" and "or", and the comma and period are used together to produce the appropriate logical relationship between the various items A through F. The sublanguage interprets the query into pattern-action rules which reveal the combination of relations that organize queries, and which allow the creation from each sentence of a first-order logic assertion, reflecting the Boolean and other logical assertions or relations in the text.

The sublanguage processor uses the principles of text structure analysis and models of discourse to automatically identify conjunction, disjunction, mandatory, positive, and negative portions of a query. The principles employed are based on the general observation among discourse linguists that writers are influenced by the established schema of the text-type they produce, and not just on the specific content they wish to convey. This established schema can be delineated and used to computationally instantiate discourse-level structures. In the case of the discourse genre of queries written for online retrieval systems, empirical evidence has established several techniques for locating the positive, negative, disjunction, conjunction, and mandatory aspects:

3.10.1 Lexical Clues. There exists a class of frequently used words or phrases that, when used in a logical sequence, establish the transition from the positive to the negative portion of the query (or the reverse). Such a sequence might be as simple as "I am interested in" followed by, "but not". [Clue words or phrases must have a high probability within the confines of a particular context.]

3.10.2 Component Ordering. Components in a query tend to occur in a certain predictable sequence, and this sequence can be used as a clue to establish negation.

3.10.3 Continuation Clues. Especially in relatively long queries a useful clue for the user's conjunction or disjunction requirements across sentence boundaries is relations which occur near the beginning of a sentence and which have been observed in tests to predictably indicate the nature of the logical transitions from sentence to sentence.

3.11 Negation Identifier 232

Negation detection is unique to queries. It is common for queries to simultaneously express both items of interest and those items that are not of interest. For example, a query might be phrased "I am interested in A and B, but not in C." In this instance, A and B are required (they are in the "positive" portion of the query) and C is negated and not required (it is in the negative portion of the query). Terms in the positive and negative portions of the query are considered for document matching. Terms in both portions of the query are used for foldering assignments, while terms in the positive portion of the query are used in calculating logistic regression matching scores (see later discussions on matching).

3.12 Mandatory Term Identifier 235

In addition to the logical assertion described above the query is also divided into mandatory and non-mandatory portions by sublanguage and processor 230. It is common practice for a query to be stated such that one or more terms in the query are essential for relevance. For example, a query might be stated as follows:

"I am only interested in documents that discuss A and B."

Using various linguistic clues the system recognizes these mandated requirements, and divides the query into two portions using the *AND operator. In an earlier implementation, the *AND operator assigned no weighted score to terms in the mandatory or non-mandatory portion of the query representation, but the matching of mandatory terms with a document was used for later segregation (e.g., foldering) of relevant documents. In a current implementation, the mandatory portion of the query is incorporated into the logical tree structure of the query through the *AND operator at the top level. Therefore, the tree structure of the query is <query> *AND <mandatory_yortion>.

3.13 Weighted Boolean Processor 240

As noted above, FIG. 6 shows a tree structure of the query, and the manner in which a weighted Boolean score (sometimes referred to as the fuzzy Boolean score) is assigned for each term (PN, CN, or single term) in the logical query representation. The logical representation of the requirements of the query consist of a head operator 255, which can be any operator, which links in a tree structure through nodes 257 and Boolean operators to various extracted query terms 260 at terminal nodes. Each term is assigned a possible term weight score 262. Scores are normalized such that the highest attainable score during matching (if all terms are successfully matched with a document) is 1.0.

During matching the fuzzy logical AND operator performs an addition with all matched ANDed term scores. The fuzzy OR operator selects the highest weighted score from all the matched ORed terms. For example, in the query representation of FIG. 6, if terms A, C and F are matched, then the score assigned the match would be 0.66 (that is, 0.33 from the match with query term A, and 0.33 from the match with C, which is the higher of the ORed C and F weighted scores). Recombinations and expansions of PNs and CNs are assumed to be less precise representations of the specific query requirements: Their score assignments reflect this and are calculated to be less than that of the specified CN or PN.

Note that the mandatory portion of the query is automatically assigned a maximum possible weight of 0.5 with the entire query also being assigned a maximum possible weight of 0.5. This means that terms in the mandatory portion of the query, if matched in the document, contribute twice to the overall score.

3.14 Subject Field Codes (SFC) Module 250

Subject field codes are assigned to each substantive word in the positive portion of the query. The method of assignment and the arrangement of codes is similar to that used by SFC 100 for document vector generation as described above.

4.0 Document Matching and Presentation to User
4.1 Matching Overview

Matcher 55 matches documents by comparing the documents with the query a nd assigning each document a similarity score for the particular query. Documents with sufficiently high scores are arranged in ranked order in three folders, according to their relative relevance to the substance of a query. There are a number of evidence sources used for determining the similarity of documents to a query request, including:

Complex Nominals (CNs)*
Proper Nouns (PNs)*
Subject Field Codes (SFCs)
Single Terms*
Text Structure
Presence of Negation
Mandatory requirements

*CNs, PNs, and Single Terms are collectively called "terms."

Documents are arranged for the user based on a two-tier ranking system. The highest-level ranking mechanism is a system of folders. Documents are placed within folders based on various criteria, such as the presence or absence of mandatory terms. The lower-level ranking mechanism sorts documents within each folder based on criteria such as similarity score, document date assignment, etc.

The operation and function of the matcher is not dependent on the number or specific interrelationship of the folders, or on the within-folder mechanisms used to rank and display documents, or on the number of evidence sources used to compute document relevance scores as described below.

Using the evidence sources mentioned above, the matcher determines the similarity or suitable association between query and documents. Foldering is based on the presence or absence and logical relationship in a document of query terms, negation and mandated terms. Within folders, document rank position is computed using match scores for the whole document and for up to 8 segments, or logical paragraphs, that make up the document (see earlier discussions for an explanation of logical paragraphs).

4.2 Scoring

Five sources of evidence are used to compute five individual measures of similarity (scores) between the query and a given document, and the five individual scores are combined to form a single relevance score. The five sources of evidence, normalized (where appropriate) for document length, are:

4.2.1 Positive Quorum (PQ)

The PQ is the fuzzy Boolean score for all terms in the positive portion of the query, computed as discussed above in connection with weighted Boolean processor 240.

4.2.2 Positive Term (PT)

The PT is a combination of the TF.IDF scores for the terms in the positive portion of the query. The product of TF.IDF for a given term in a document provides a quantitative indication of a term's relative uniqueness and importance for matching purposes. A natural-log form of the equation for TF.IDF, where TF is the number of occurrences of a term within a given document, and IDF is the inverse of the number of documents in which the term occurs, compared to the whole corpus, as shown below:

$$TF.IDF = (\ln(TF)+1) \cdot \ln(N+1/n)$$

where N is the total number of documents in the corpus, and n is the number of documents in which the term occurs. These TF.IDF scores are calculated for the documents.

The way that the TF.IDF scores are combined for the PT is in accordance with the combination of scores discussed above in connection with weighted Boolean processor 240 (i.e., based on the structured logical representation of the query described earlier). However, the scores for the nodes are equal to the TF.IDF scores for the terms rather than the normalized scores described above (maximum scores of 0.33, 0.33, 0.33, 0.17, and 0.17 for the example in FIG. 6).

4.2.3 Positive Text Structure (PTS)

The PTS is the fuzzy Boolean score for all query terms in the positive portion of the query matched within the correct text structure component/s. For positive text structurer, each query term is assigned with a weight which is based on how the query terms are organized as a logical requirement and on the text structurer requirements extracted from the query statement. The assignment of PTS scores is as follows:

1. IF a query term does not match with any one of the index terms for a document, THEN no PTS score is generated based on the query term.

2. ELSE, IF a query term matches with one of the index terms for a document AND IF the text structurer requirements which are assigned to the query term do not have any common text structurer tags assigned to the index terms, THEN no PTS score is generated based on the query term.

3. ELSE, IF there is at least one term in common between the query and a document and that term also has the common text structurer tag, THEN a PTS score is generated. The score is the product of the query term weight and the number of matching text structurer tags, divided by the total number of text structurer tags which are assigned to the query term. Consider the following example:

```
<POSITIVE>
{
        document_retrieval|AN,FU|0.5
        &AND
        information_extraction|AN,FU|0.5
}
</POSITIVE>
``` where a query consists of two terms ("information retrieval" and "information extraction"), with the query text structurer assignments being Analytic (AN) and future (FU). The score assignment based on PTS for the presence of each term in a document within the correct text structurer is 0.5, respectively.

If there are three documents with the following index terms (for a description of this representation of terms, see section on text structurer):

| document_retrieval | 25 | 3425 | 1 | AN | 9 | 600 |
|---|---|---|---|---|---|---|
| information_extraction | 19 | 3425 | 1 | CE | 4 | 600 | then the PTS score for document 3425 will be:

PTS score based on document_retrieval: 0.5*1/2=0.25

PTS score based on information_extraction: 0.5*0/2=0

PTS score for 3425=0.25+0=0.25

4.2.4 Positive Paragraph Matching (PPM)

The fuzzy Boolean score for query terms in the positive portion of the query is computed for each logical paragraph in the document. The PPM is the largest of these scores for that document.

4.2.5 Sublect Field Code (SFC) Vector Match

For the SFC match score, first the subject vector for each text (document or query) is normalized using a term weighting formula in order to control for the effect of document length. The matching score between the query and document is determined by the correlation or association between them, which is computed by a similarity measure that treats the query and document vectors as two data points in the multi-dimensional space and then computes the distance between these two data points.

4.2.6 Combining Individual Scores

In the preferred implementation, a logistic regression analysis using a Goodness of Fit model is applied to combine individual scores which are described in sections 4.2.1 to 4.2.5. Thus, the individual scores act as independent variables in the logistic regression formula. The combined score is also referred to as the relevance score.

Other formulas can be used to combine individual scores to generate relevance scores. Relevance scores can be calculated using different methods using the same or similar evidence sources. For example, it is possible to use a Nearest Neighborhood approach [Hanson90] to ascertain which documents match with a given query.

Five independent variables are used (the implementation of the matcher is not dependent on the number of evidence sources used). Regression coefficients for each variable are calculated using an extensive, representative test corpus of documents for which relevance assignments to a range of queries have been established by human judges.

Using the evidence sources listed above, the logistic probability (logprob) of a given event is calculated as follows:

$$\text{logprob (event)} = 1/(1+e^{-Z})$$

where Z is the linear combination:

$$Z = B_o + B_1 X_1 + B_2 X_2 + \ldots B_5 X_5$$

and $B_{1-5}$ are the regression coefficients for the independent variables $X_{1-5}$. Documents are ranked by their logistic probability values, and output with their scores.

One or more but not all independent variables can be removed from the formula to generate relevance scores. Furthermore, additional of independent variables beyond those described in sections 4.2.1 to 4.2.5 can be included.

For example, in the preferred implementation, an extra independent variable, which represents the length of each document in the database, is used. This independent variable is a linearly transformed value which is based on the number of words in the document in consideration.

In addition, one or more individual variables can be transformed and normalized before the values are used in the regression formula or any other formula which are used to generate relevance scores. For example, it is possible to transform every individual variable to account for the length of the document in consideration instead of using an extra independent variable.

4.3 Foldering

Documents are ordered within folders by their logistic probability values, SFC values, date, or other specified criterion. The main foldering scheme is based on various match criteria and/or match scores. Other foldering schemes, such as view-by-subject, will be described in a later section. The total number of documents in all folders can be selected by the user (see later discussion). In this preferred embodiment, three folders are used. The assignment of documents to folders is determined as follows:

4.3.1 Folder One. All Unique single terms appear in a single logical paragraph of the document; the negative logical requirement is not satisfied.

OR

All query terms that satisfy the logical truth of the query (complex nominals, proper nouns, single terms, or suitable expansions) match; the negative logical requirement is not satisfied.

OR

All query terms (or appropriate expansions) in the mandatory portion of the logical representation of the query match; the negative logical requirement is not satisfied.

4.3.2 Folder Two. Documents that have scores sufficient to pass either the user-selected cut-off for the number of documents displayed or the system determined cut-off for relevance, but the documents do not qualify for Folders One or Three.

4.3.3 Folder Three. All Unique single terms appear in a single logical paragraph of the document; the negative logical requirement is satisfied.

OR

All query terms that satisfy the logical truth of the query (complex nominals, proper nouns, single terms, or suitable expansions) match; the negative logical requirement is satisfied.

OR

All query terms (or appropriate expansions) in the mandatory portion of the logical representation of the query match; the negative logical requirement is satisfied.

4.4 Retrieval Criteria and Recall Predictor

The matching of documents to a query organizes documents by matching scores in a ranked list. The total number of presented documents can be selected by the user, the system can determine a number using the Recall Predictor (RP) function, or, in the absence of user input, the system will retrieve all documents with a non-zero score. Note that documents from different sources are interfiled and ranked in a single list.

The RP filtering function is accomplished by means of a multiple regression formula that successfully predicts cut-off criteria on a ranked list of relevant documents for individual queries based on the similarity of documents to queries as indicated by the vector matching (and optionally the proper noun matching) scores. The RP is sensitive to the varied distributions of similarity scores (or match scores) for different queries, and is able to present to the user a certain limited percentage of the upper range of scored documents with a high probability that close to 100% recall will be achieved. The user is asked for the desired level of recall (up to 100%), and a confidence interval on the retrieval. While in some cases a relatively large portion of the retrieved documents would have to be displayed, in most cases for 100% recall with a 95% confidence interval less than 20% of the retrieved document collection need be displayed. In trials of the DR-LINK system (level of recall 100%, confidence level 95%), the system has collected an average of 97% of all documents judged relevant for a given query [Liddy94b].

4.5 Clustering

Documents can be clustered using an agglomerative (hierarchical) algorithm that compares all document vectors and creates clusters of documents with similarly weighted vectors. The nearest neighbor/ward's approach is used to determine clusters, thus not forcing uniform sized clusters, and allowing new clusters to emerge when documents reflecting new subject areas are added. These agglomerative techniques, or divisive techniques, are appropriate because they do not require the imposition of a fixed number of clusters.

Using the clustering algorithm described above, or other algorithms such as single link or nearest neighbor, DR-LINK is capable of mining large data sets and extracting highly relevant documents arranged as conceptually-related clusters in which documents (possibly from several languages) co-occur.

Headlines from newspaper articles or titles from documents in the cluster are used to form labels for clusters. Headlines or titles are selected from documents that are near the centroid of a particular cluster, and are therefore highly representative of the cluster's document contents. An alternative labeling scheme, selectable by the user, is the use of the labeled subject codes which make up either the centroid document's vector or the cluster vector.

The user is able to browse the documents, freely moving from cluster to cluster with the ability to view the full documents in addition to their summary representation. The user is able to indicate those documents deemed most relevant by highlighting document titles or summaries. If the user so decides, the relevance feedback steps can be implemented and an "informed" query can be produced, as discussed below.

The DR-LINK system is thus able to display a series of conceptually-related clusters in response to a browsing query. Each cluster, or a series of clusters, could be used as a point of departure for further browsing. Documents indicative of a cluster's thematic and conceptual content would be used to generate future queries, thereby incorporating relevance feedback into the browsing process.

Figure 7:
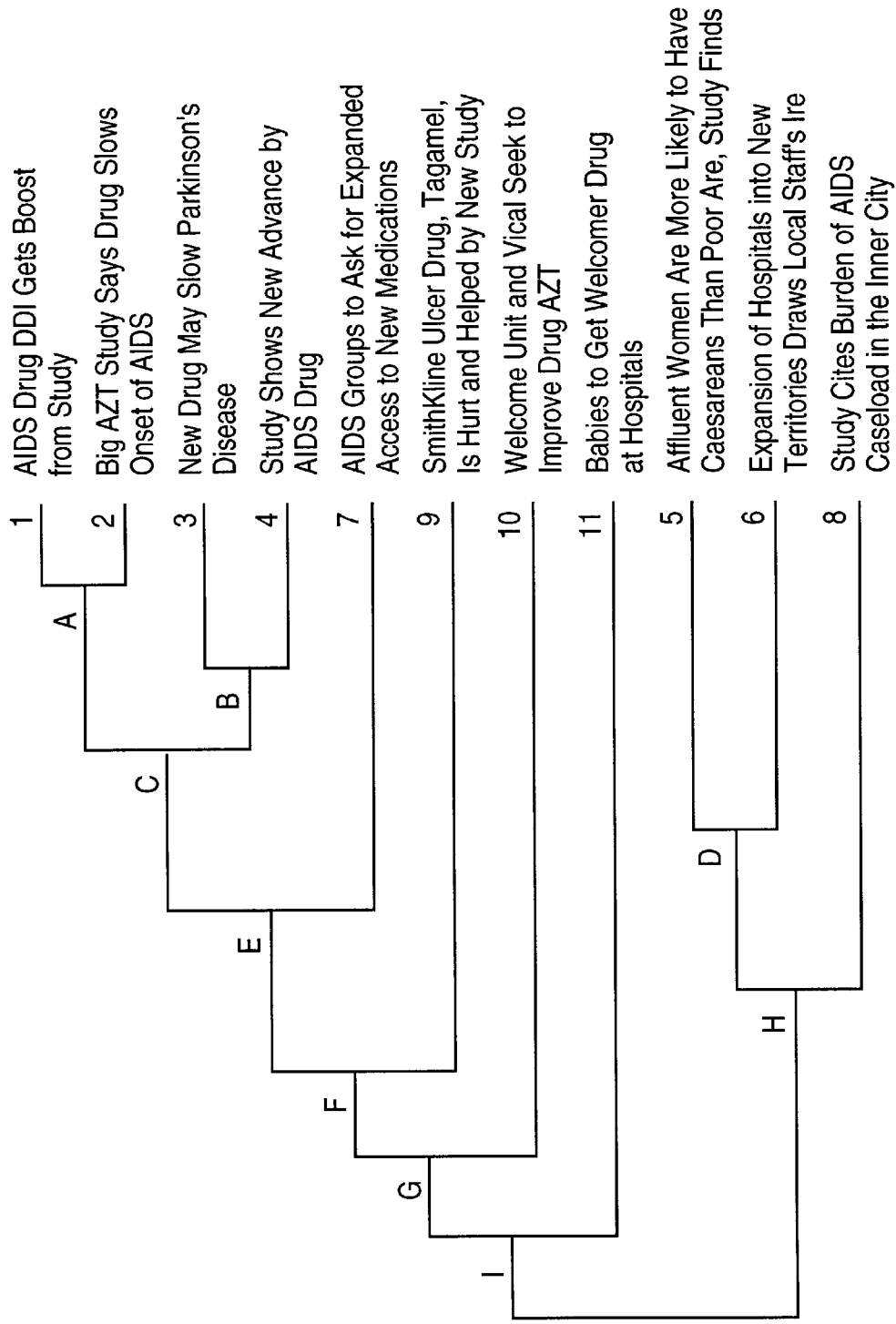
FIG. 7 shows an example of clustering.

FIG. 7 shows a sample result of agglomerative algorithm based document clustering. Each document is represented as the headline of the document in the far right column. The numbers which are placed before the headlines show the document clustering steps. The first and the second documents in the far right column are identified as the members of the first cluster (i.e., cluster A). The third and fourth documents become the second cluster (i.e., cluster B). Then the first and the second cluster form the third cluster (i.e., cluster C). In the final step, the cluster which contains 8 documents from the top (i.e., cluster G) is combined with another cluster which contains three documents from the bottom (i.e., cluster H) to form one final cluster (i.e., cluster I). It is convenient to consider the representation of the cluster as a tree.

4.6 Developing "Informed" Queries for Relevance Feedback

Relevance feedback is accomplished by combining the vectors of user-selected documents or document clusters with the original query vector to produce a new, "informed" query vector. The "informed" query vector will be matched against all document vectors in the corpus or those that have already passed the cut-off filter. Relevant documents will be re-ranked and re-clustered.

4.6.1 Combining of Vectors. The vector for the original query and all user-selected documents are weighted and combined to form a new, single vector for re-ranking and re-Clustering.

4.6.2 Re-Matching and Ranking of Corpus Documents with New, "Informed" Query Vector. Using the same similarity measures described above for matcher 55, the "informed" query vector is compared to the set of vectors of all documents above the cut-off criterion produced by the initial query (or for the whole corpus, as desired), then a revised query-to-document concept similarity score is produced for each document. These similarity scores are the system's revised estimation of a document's predicted relevance. The set of documents are thus re-ranked in order of decreasing similarity of each document's revised predicted relevance to the "formed" query on the basis of revised similarity value.

4.6.3 Cut-Off and Clustering after Relevance Feedback. Using the same regression formula described above in connection with the recall predictor, a revised similarity score cut-off criterion is determined by the system on the basis of the "informed" query. The regression criteria are the same as for the original query, except that only the vector similarity score is considered. The agglomerative (hierarchical) clustering algorithm is applied to the vectors of the documents above the revised cut-off criterion and a re-clustering of the documents will be performed. Given the re-application of the cut-off criterion, the number of document vectors being clustered will be reduced, and improved clustering is achieved.

4.7 Variations on MLM

There are a number of different ways to implement the MLM functionality. First, while the current implementation combines the selected (or marked) document representations with the initial query representation to generate a revised query representation, it is also possible to base the query entirely on the document representations, and ignore the initial query representation. Additionally, while it is possible to rely on the stored document representations, it may be more efficient, especially if the user selects only portions of a document, to reprocess the selected documents to generate the revised query. In a current implementation, the latter is done.

The MLM functionality gives rise to an additional way to use the DR-LINK processing capabilities. A set of documents need not arise from running a query using the DR-LINK system. Any collection of relevant documents, including a single document, could be used to formulate a query to find additional documents like the collection. These documents need only be identified to the DR-LINK system and processed as if they were MLM documents arising from a query. If the documents were not in the database, their representations would have to be generated and combined.

Prior art searching is an example of an application where such a "queryless search" capability could be particularly useful. The user could be aware of a set of documents, which had they been published earlier, would be highly relevant prior art. By identifying such documents, the user could run a query whose representation was based on these documents. By limiting the search to an early enough date range, the retrieved documents would be highly likely to represent highly relevant prior art.

5.0 Graphic User Interface Overview System

In general, the graphic user interface (GUI) for the DR-LINK information retrieval system is a sequence of related screens, windows and associated graphical environments that facilitate interactions with users. Specifically, the GUI allows users to: interact with the system to select data resources; to create a natural language query; to alter, expand or otherwise interact with the computer-generated query representation; to select criteria for retrieving, ranking and displaying documents; and to re-submit a query based on the contents of documents considered highly relevant. The GUI allows the user to interact and influence the various processing elements of the DR-LINK system described earlier in this application.

Like the DR-LINK system, the GUI can exist is a variety of computing environments using a variety of software, hardware and operating systems. The specific instantiation discussed in this application is for the Microsoft Windows operating environment, from the Microsoft Corporation, Redmond, Seattle, Wash. Other instantiations for the GUI include an online, world-wide web-based system using the Netscape browsing tool, available from Netscape Corporation, Mountain View, Calif. Other versions of the GUI client system are possible for other computing environments. The general features and methods used with the GUI and discussed in this application are independent of the computing environment.

5.1 Typical Screen

Figure 8:
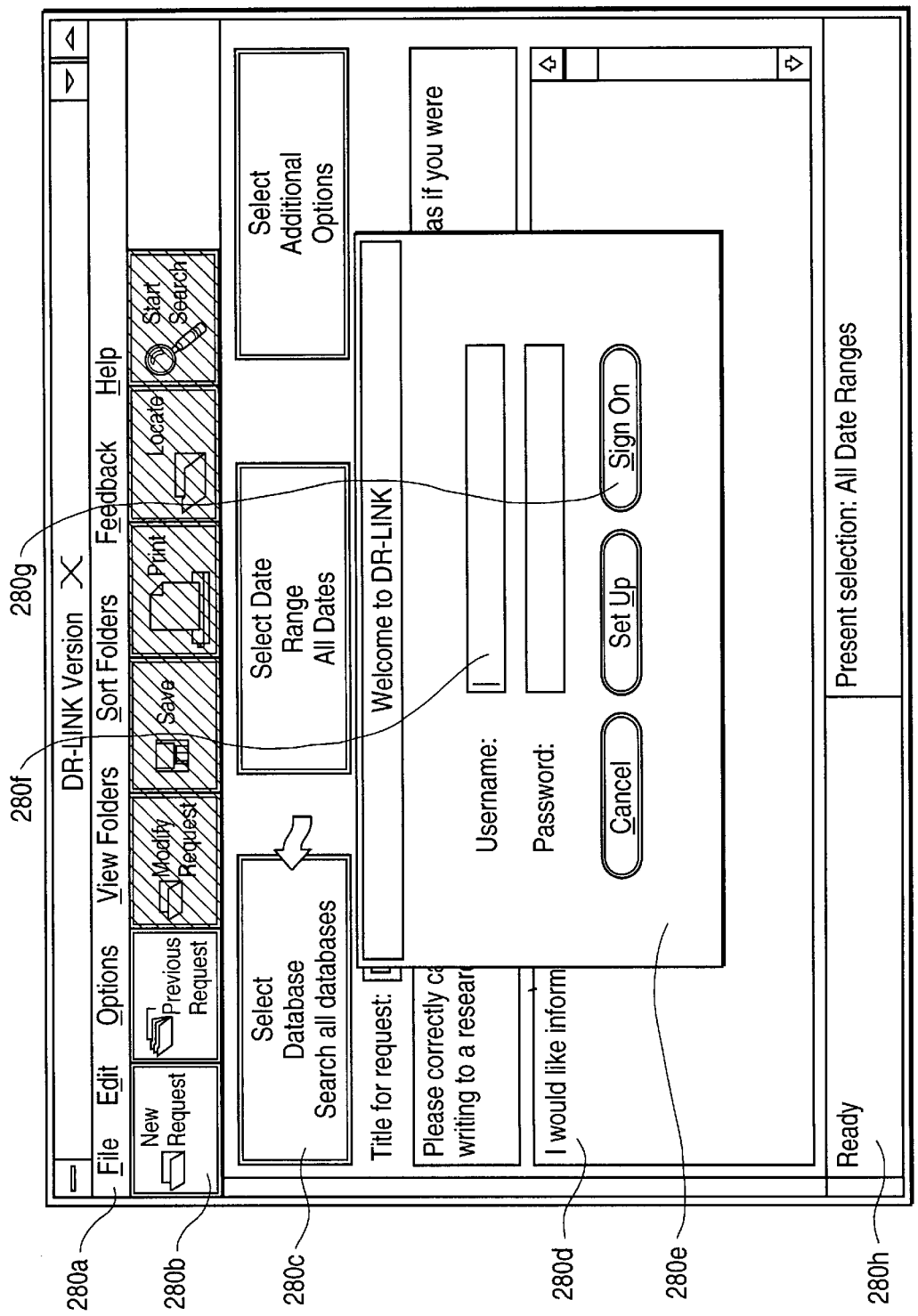
FIG. 8 is a screen shot showing the general features common to most screens used in the graphic user interface (GUI)

FIG. 8 shows a typical GUI screen 280. All GUI screens share common features and elements, arranged in a consistent manner for easy navigation. Processing is activated by positioning an on-screen cursor using a pointing device, and using associated buttons to select items, pull-down menus, or position a text cursor for inputting characters. These common on-screen elements include: A menu bar 280a; a navigational toolbar 280b, consisting of a series of buttons which each initiate various DR-LINK features, subroutines or actions; an options toolbar 280c, allowing the user to specify processing attributes; various on-screen windows 280d, in which users can type free-form text and interact with the computer system; and various pop-up dialog boxes 280e, which include instructions for typing text in boxes 280f, with related pop-up window buttons 280g. At the bottom of the screen is a status bar 280h. In addition, users are able to select one or several items by clicking on selection boxes (e.g., see FIG. 12), or by selecting a check button (e.g., FIG. 12). Together, these items allow users to interact with and navigate through the information retrieval system.

5.2 Sequence Overview

Figure 9A:
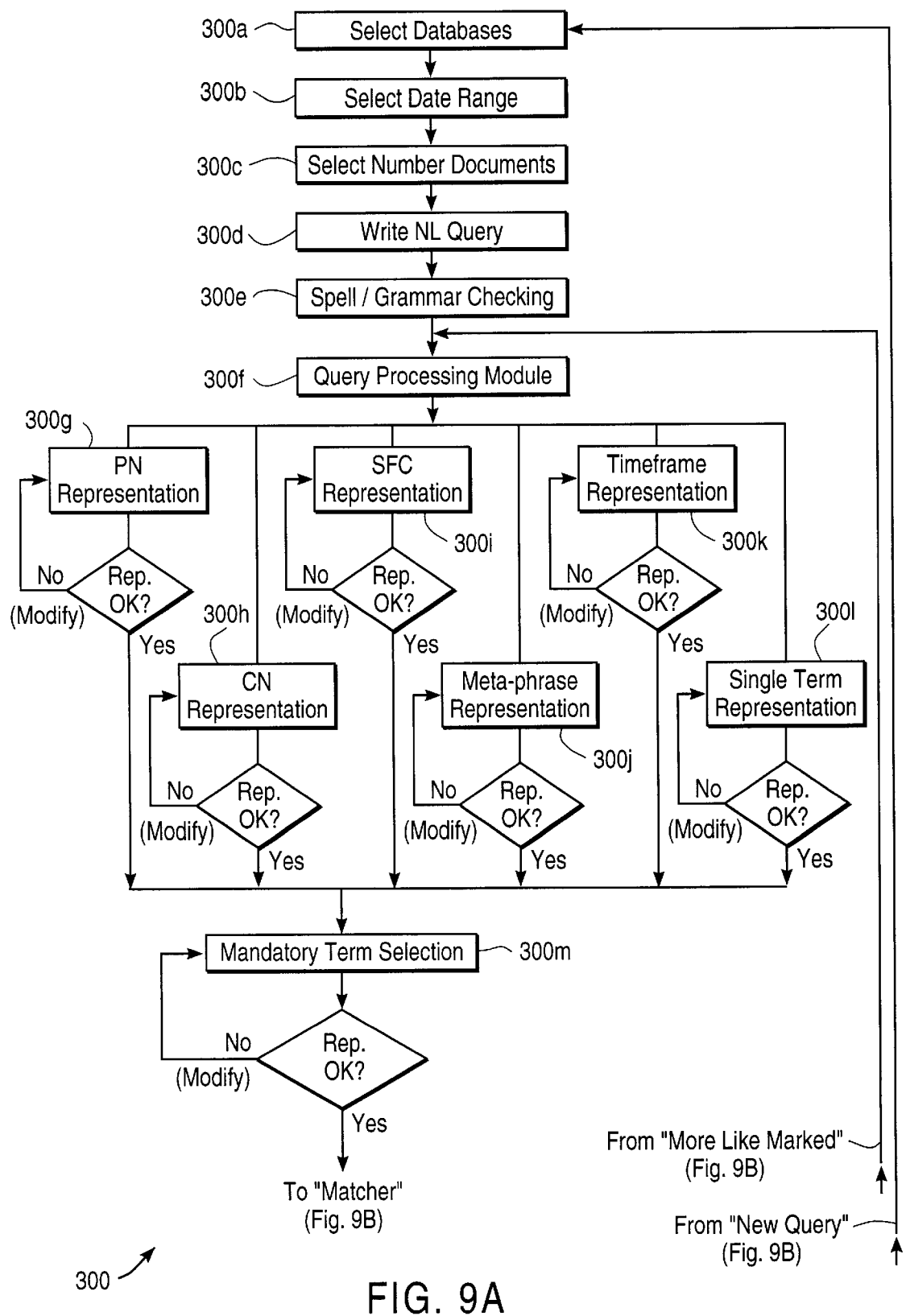
FIGS. 9A and 9B, taken together, form a flow diagram showing the GUI-based interactive process of text retrieval.
Figure 9B:
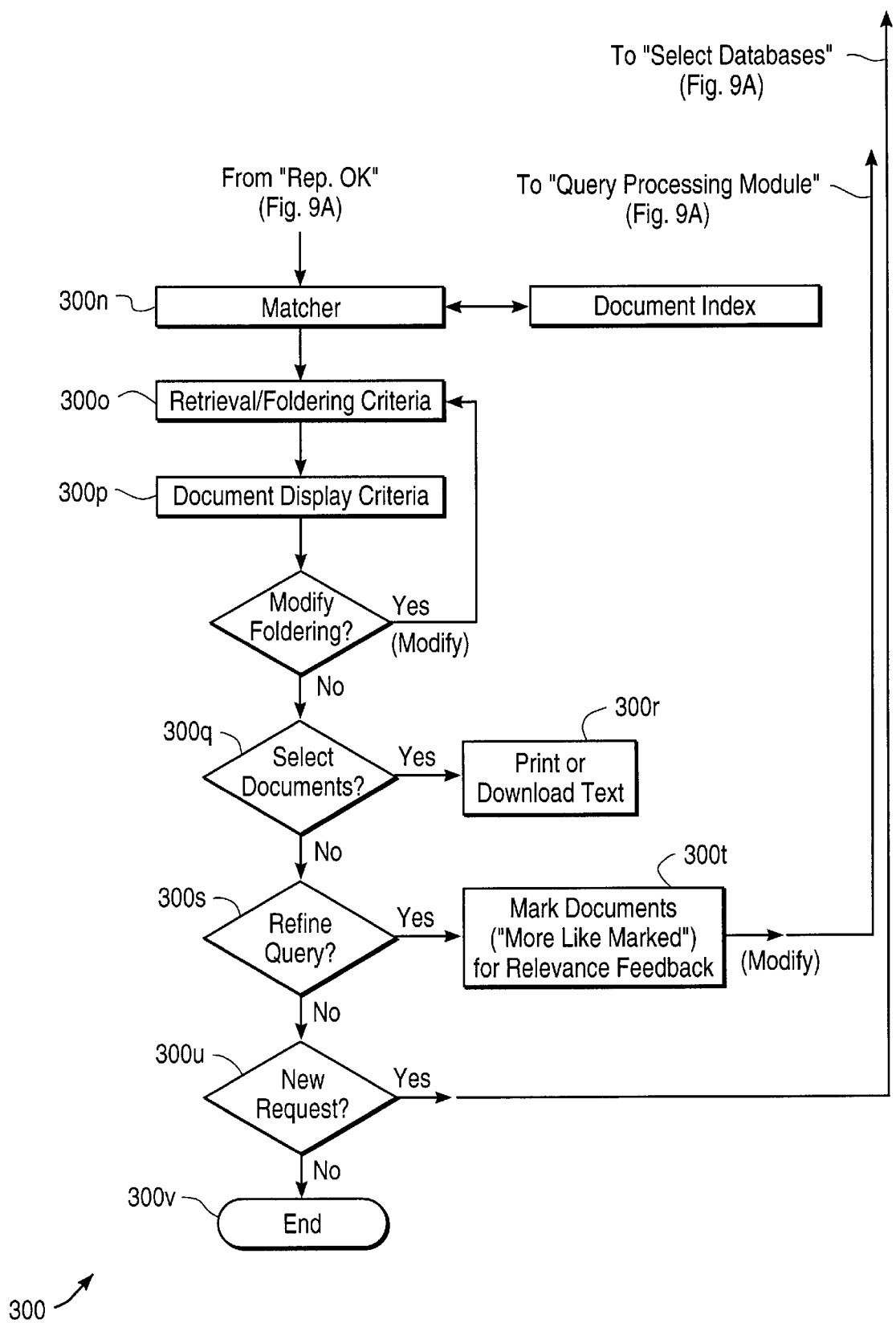

FIGS. 9A and 9B, taken together, provide a flowchart showing a preferred sequence 300 of GUI-based interactions between the DR-LINK system and the user. A total of 22 specific interactions are shown and many will be described with reference to particular display screens. A number of the interactions occur before the query is processed (including login, data selection, and query construction), a number occur after initial query processing but before query execution (query review and feedback), and a number occur after the documents are retrieved (including retrieval and display criteria selection, the display of relevant documents in various formats, the marking of relevant documents, the construction of new, informed queries based on the contents of documents deemed highly relevant, and printing or storing marked documents). The actual process of text retrieval is fully interactive and recursive: Users are able to navigate through the system at will using any combination of the steps outlined below. Not all steps are required, nor is the specific sequence of steps required.

Prior to initiating query processing, the user selects databases (300a—see FIG. 12), selects a date range (300b—see FIG. 13), selects a number of documents to retrieve (300c), composes a natural language query (300d), invokes spelling and grammar checking (300e), and initiates query processing (300f).

As described in detail above, the query processor generates a number of representations of the query. As will be described below, manifestations of these representations are displayed (see FIGS. 14A and 14B), and the user is given the opportunity to determine whether the system's analysis of the query is satisfactory or needs modification. These representations include proper noun (300g), complex nominal (300h), SFC (300i), meta-phrase (300j), time frame (300k), single term (300l). The system also provides the system's interpretation of which terms in the query are deemed to be mandatory (300m), and solicits user input. Once the user has modified the system's interpretation of the query, the user invokes the matcher (300n) which executes the query against the database.

Once the documents have been retrieved and placed in folders, the user is given an opportunity to modify the retrieval/foldering criteria (300o) and document display criteria (300p). The user may then select documents (300q) for printing or downloading (300r), or for the purpose of refining the query (300s—see FIG. 19). If the user has marked documents deemed by the user to be particularly relevant, the user can invoke the more-like-marked feature (300t), which causes the query representation to be modified in view of the documents and the refined query to be rerun. The user is, at any time, free to initiate a new search request (300u), or exit the system (300v).

6.0 User Interaction With the System Before Query is Processed

6.1 Sign On

Figure 10:
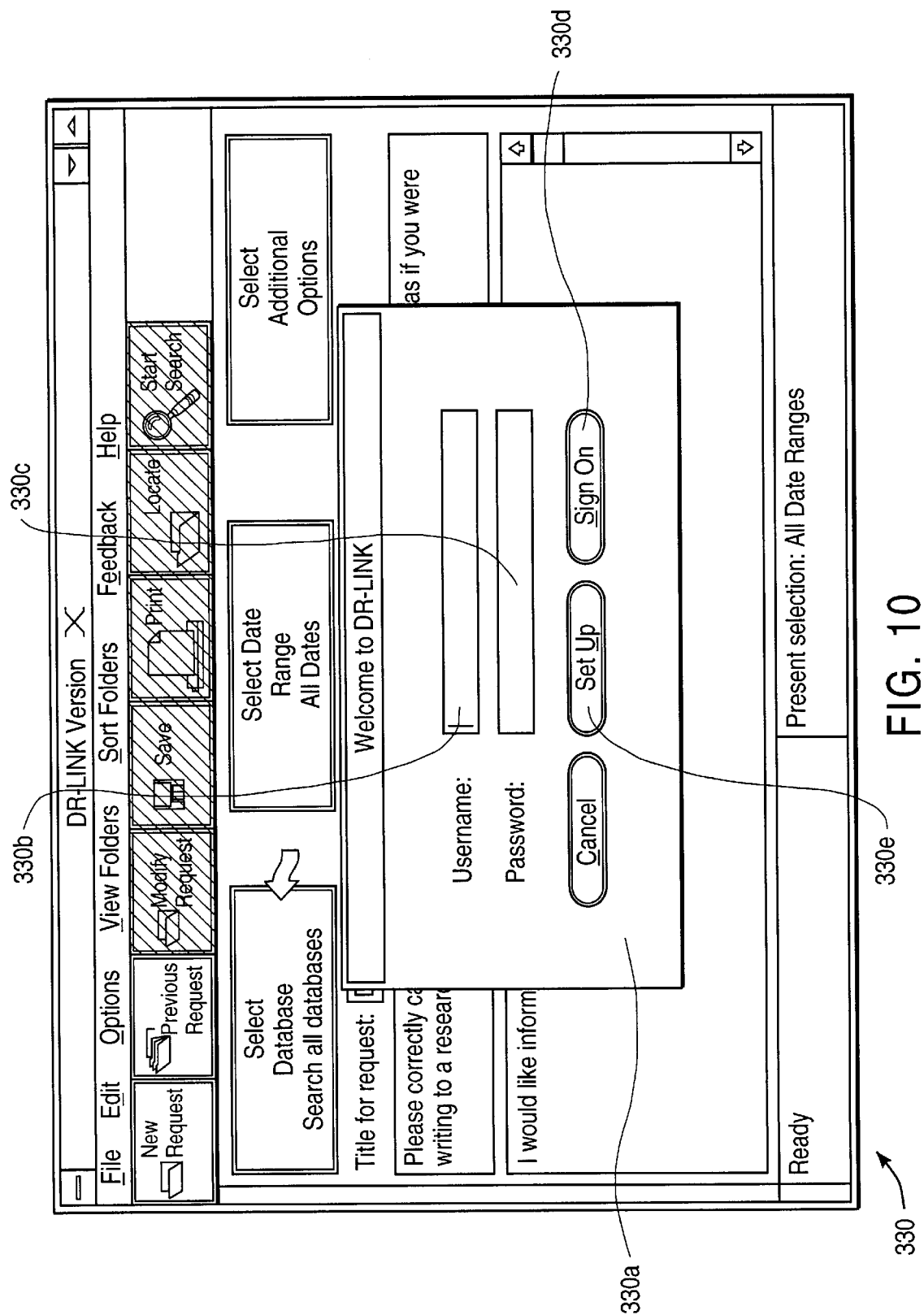
FIG. 10 is the sign-on screen.

FIG. 10 shows the initial screen 330 that appears when a user selects the DR-LINK software program for operation. The initial screen prompts the user to sign-on using a pop-up dialog box 330a. The user is requested to provide a registered username in a field 330b and unique password code in a field 330c. Only users with registered usernames and valid passwords are allowed to proceed. Once a valid and correct username and password have been entered, the user selects the "Sign On" button 330d to enter the system. If the user fails to select a valid username or password, the system will prompt for corrected identification. The "Set Up" button 330e allows the user to configure the nature and type of modem-based communications between the host computer and the remote DR-LINK client computer system, which comprises the DR-LINK system outlined earlier in this application.

6.2 Select Databases

Figure 11:
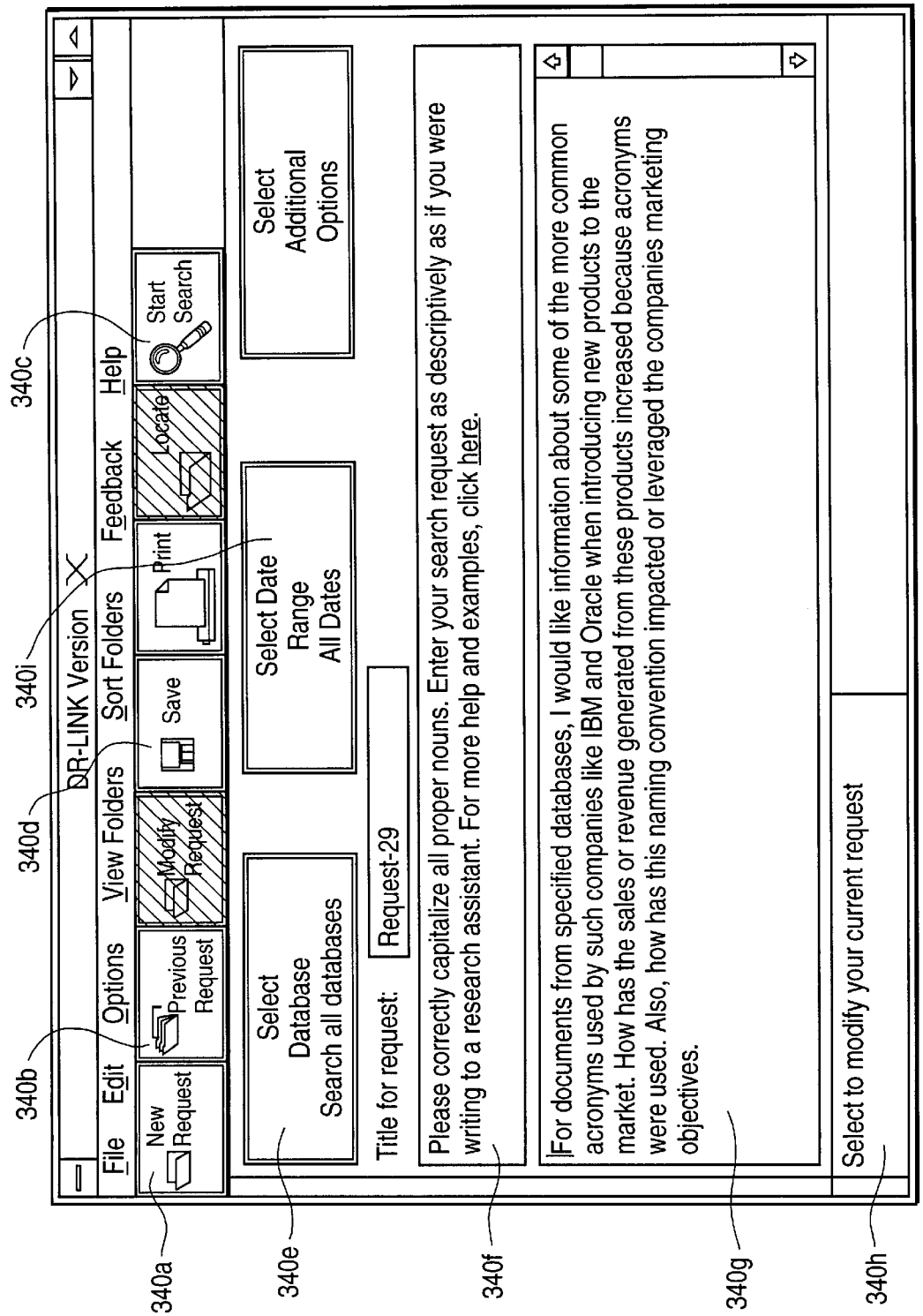
FIG. 11 is the query screen.

FIG. 11 shows a query screen 340 which appears once the user is signed-on to the DR-LINK system. Among the elements of the query screen are a sequence of navigational toolbar items 340a, 340b, 340c, and 340d, a sequence of option toolbar items 340e, an instructional window 340f with hyperlinked online help, a query window 340g for entering a free-form query statement, and a status bar 340h. Users of the system can select a range of data sources by activating the "Select Database" option toolbar button.

Figure 12:
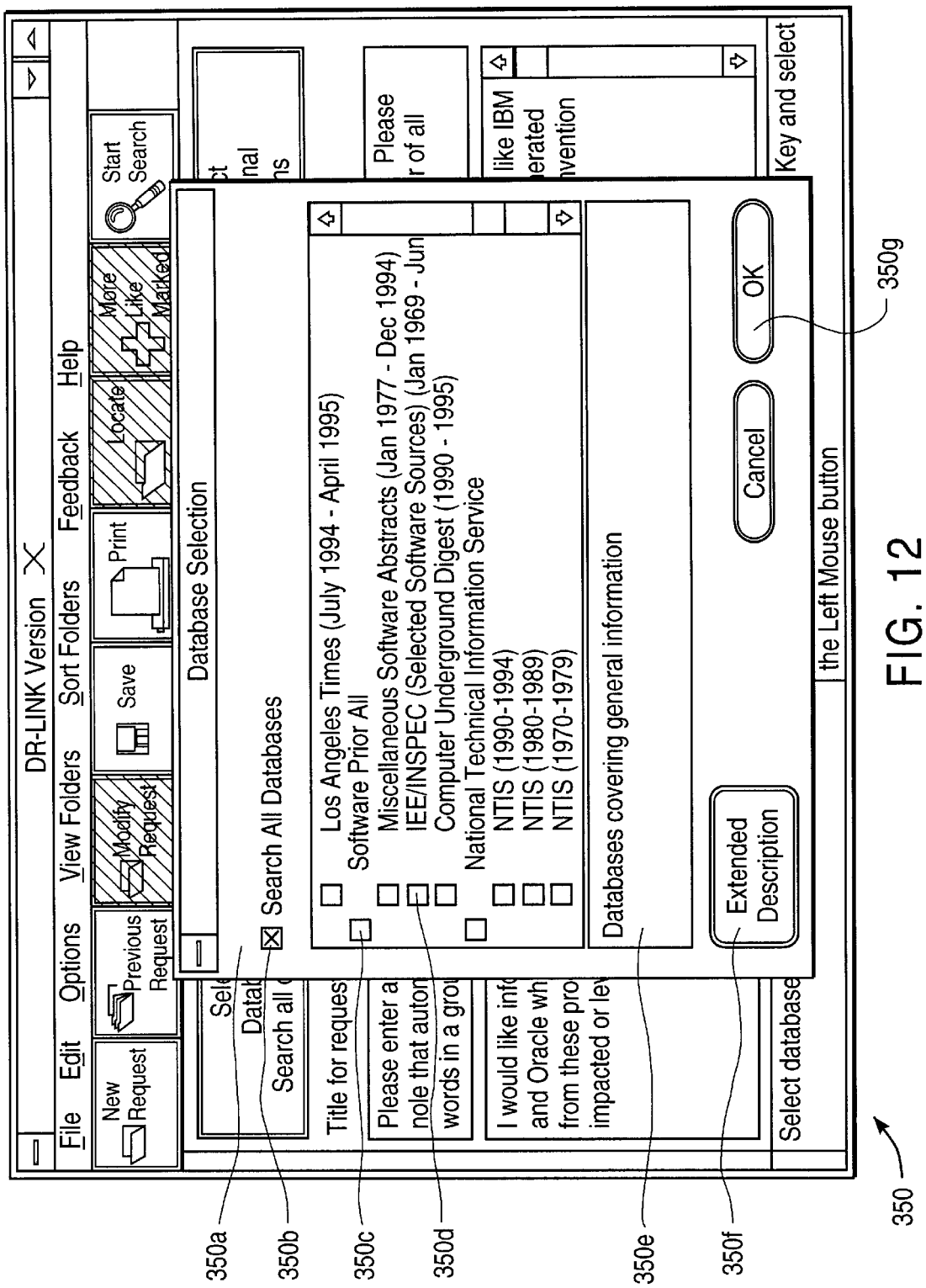
FIG. 12 is the database selection screen.

FIG. 12 shows the "Select Database" screen 350 with pop-up dialog box 350a. The default setting for database selection is "Search all Databases" 350b; users are able to customize the default as required. Alternatively, users can specify which databases are to be searched for a given query by selecting classes of publications 350c or individual publications 350d within a class using selection boxes. Databases are arranged as clusters of related source files (see later description of the arrangement of categories, databases and sources). Brief descriptions of selections are shown on selection 350e; this description can be amplified by selecting the "Extended Description" button 350f. Selecting the "OK" button 350g returns the user to query screen 340.

6.3 Select Date Range

Figure 13:
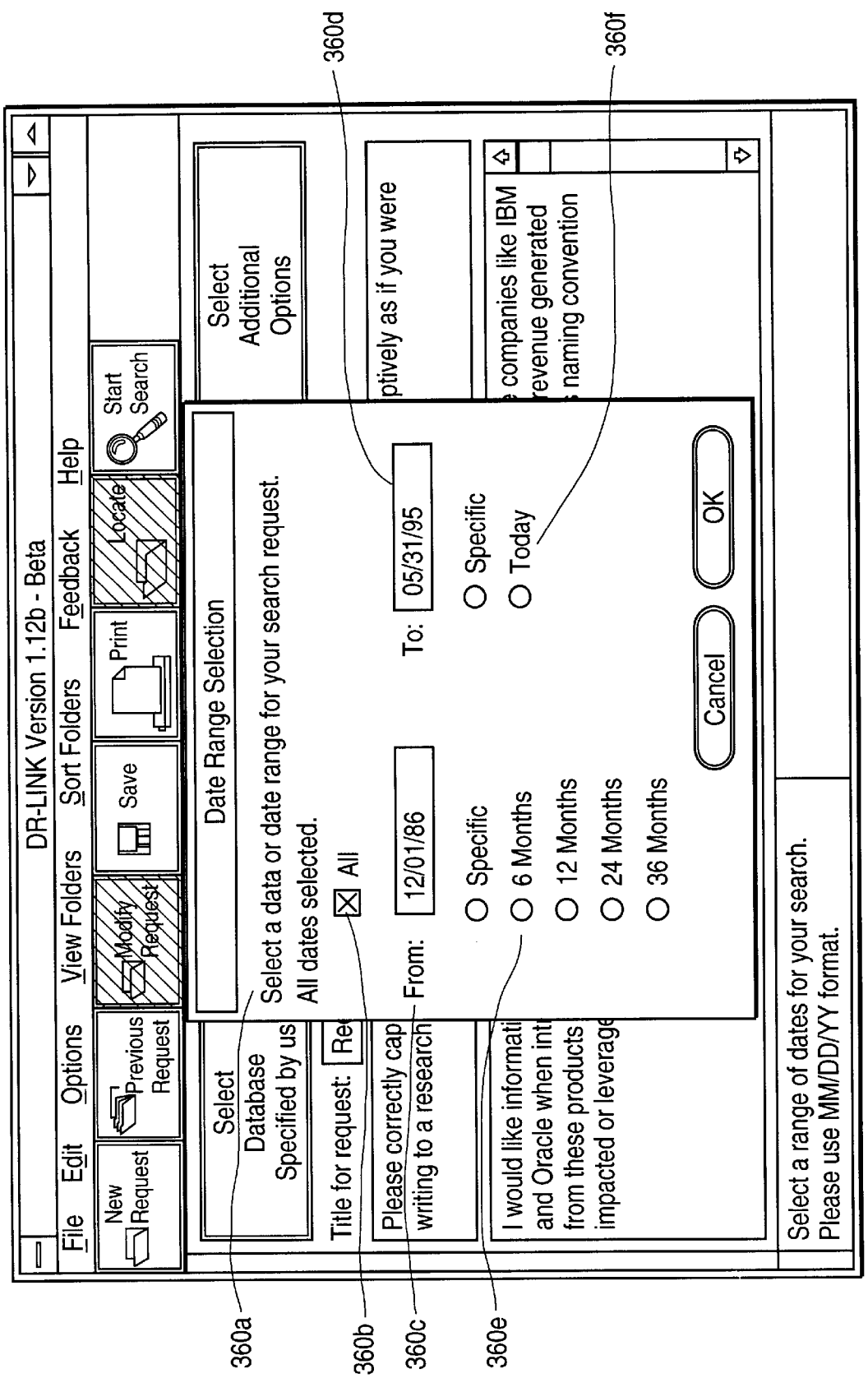
FIG. 13 is the date and/or time selection screen.

FIG. 13 shows a date selection screen 360. From query screen 340 (FIG. 11), selecting "Select Date Range" 340i from the options toolbar activates the "Date Range Selection" pop-up window 360a. The default for date range selection is "All Dates Selected" 360b, although the default can be changed by the user. The selection of dates can be over a range using either exact dates 360c and 360d, or by selecting pre-determined ranges using radio buttons 360e and 360f. Activating the "OK" button returns the user to query screen 340 (FIG. 11). Dates are computed using the document date field identified by the DR-LINK system in initial document preprocessing.

6.4 Select Number of Documents (Preference), Scope, and Dialogs

Several other retrieval criteria can be selected by the user using the "Select Additional Options" button from the option toolbar. An options pop-up window appears with three folders.

In the Preferences folder the user can select the number of retrieved documents to be returned based on any one or some combination of the following: the total number of documents to be retrieved; the total number of documents to be placed in any of the three folders described earlier; or the required effective level of recall, using a novel recall predictor (RP) function.

The RP filtering function is accomplished by means of a multiple regression formula that successfully predicts a ranked-list or cut-off criterion for individual queries based on the similarity of documents to queries as indicated by the DR-LINK matching scores. The RP is sensitive to the distribution of match scores for a given query. Users are asked to state a desired level of recall and a confidence level for that level of recall. Using a regression formula, the RP system is able to compute a cut-off point based on a lower-bound match-score that, to the stipulated confidence level, will include relevant document to the stipulated recall level. While in some cases a relatively large portion of the retrieved documents would have to be displayed, in most cases for 100% recall with a 95% confidence interval less than 20% of the retrieved document collection need be displayed. In trials (level of recall 100%, confidence level 95%) the system has collected an average of 97% of all documents judged relevant for a given query [Liddy94b].

The Scope folder allows users to specify which databases will be searched for relevant documents. Documents are arranged in a three-tier file system. At the upper level of the file system are categories (e.g., "Software Prior Art"); within categories are databases (e.g., IEEE publications); within databases are individual sources (e.g., the IEEE publication "Applied Astrophysics").

The Dialogs folder allows users to select the More Like Marked (MLM) relevance feedback feature described later.

6.5 Write Natural Language Query

As stated earlier, DR-LINK makes no requirement that the user state a query using prescribed annotations or logical formulations. Instead the query can be stated in fully-formed natural sentences and the DR-LINK processing modules automatically create various representations of the query used for document retrieval. Query statements are entered in query window 340f of query screen 340 (FIG. 11). Queries can be of any length and of any complexity. Mandatory requirements can be stated using common phraseology (e.g., "All documents must mention . . . " or "I am only interested in information that specifies . . . ").

The system is also sensitive to statements of negation, which can also be entered using natural language (e.g., "I am not interested in . . . " or "Documents discussing X are not useful"). Proper nouns can be entered in variant forms (e.g., "Lincoln," "President Lincoln" or "President Abraham Lincoln") and clarifications or expansions will automatically be made. Complex nominals (CNs), noun phrases and other related parts of speech will be recognized, and variant synonymous expressions will automatically be generated.

The subject-content of queries is also captured at the conceptual level by SFC 250. The temporal nature of the query (past, present, future or some combination thereof) is also captured using Meta-Phrase Identifier 180. The same module also identifies the underlying intention of the query (a request for analytic information, evaluation, cause/effect, etc.) and this is used for matching purposes. This and other processing is performed automatically by the query processor (QP), described in detail above.

6.6 Spell/Grammar Checking

The words in the user's query are checked using a commercial off the shelf (COTS) spell checking and grammar checking system. The user is prompted when unidentified words are used in the query, and shown possible correct spellings. A similar technique is used for grammar checking.

Figure 14A:
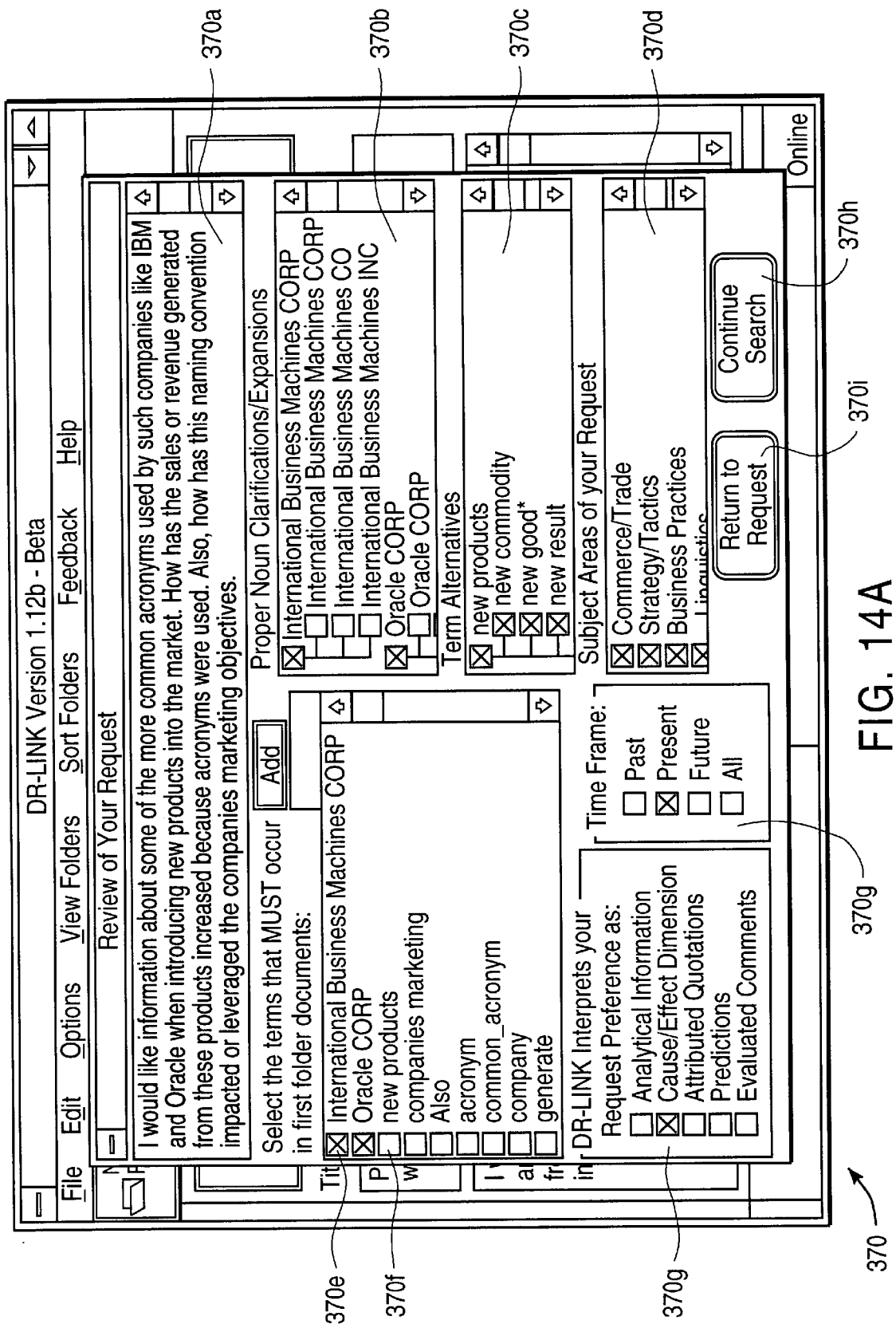
FIG. 14A is the full query processing (QP) review screen.
Figure 14B:
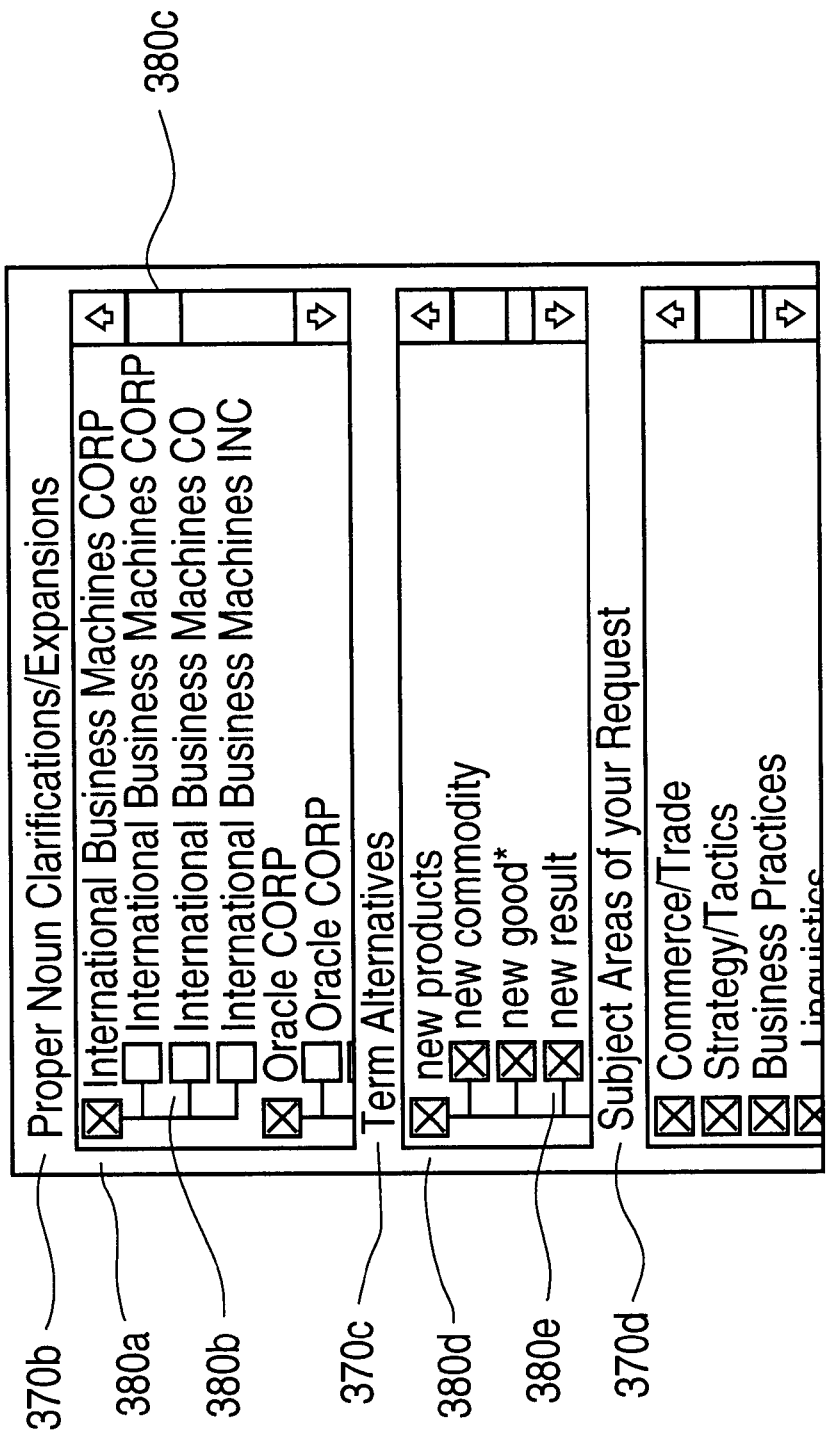
FIG. 14B is a detail of FIG. 14A, showing the arrangement of terms in the QP review screen.

7.0 User Interaction After Query Processing But Before Query Execution 7.1 Review of Your Request FIGS. 14A and 14B show the "Review of your Request" screen 370. The specific annotations and representations of the natural language query statement mentioned above are produced by the QP, and once completed, the annotated results of the QP are displayed on this screen. The "Review Your Request" screen encompasses many of the query processing (QP) interactions of items 300g through 300l in FIG. 9A.

FIG. 14A shows the full "Review of Your Request" screen and contains: A full statement of the user's query 370a; a representation 370b of the identified proper nouns (PNs), together with related clarifications or expansions; a representation 370c of complex nominals (CNs), with appropriate expansions; a ranked listing 370d of identified subject field codes (SFCS) for the query; a listing of all terms (PNs, CNs, and single terms) identified in the query identified by the QP, marked as either mandatory 370e or non-mandatory 370f; and a statement 370g of the meta-phrase requirements and temporal aspects.

FIG. 14B shows a detail 380 of FIG. 14A, specifically the term-based expansions and clarifications.

The following discussion takes each element of the query representation shown in the Review of your Request screen, and describes that representation and the user's ability to manipulate the system's initial understanding and representation of the query.

7.2 Proper Noun Representation

Using the functional capabilities of PNC 170, the system displays to the user all identified proper nouns (including group proper nouns and group common nouns). The system also generates standard and variant forms of the PN using heuristics and databases (e.g., "IBM" is recognized as having various forms, including "International Business Machines Corp.," "International Business Machines Inc.," etc.). In the special case of group proper nouns, the group is expanded to include all member proper nouns.

The standard form of the proper noun is used as a root, with variant forms indicated as branches from the root (see FIG. 14B). For example, the reference to "IBM" in the query statement has the standard form "International Business Machines Corp.," with variant forms such as "International Business Machines Inc." branching off. Referring to FIG. 14B, users are able to select which clarifications and expansions of the PN are appropriate using selection windows. The standard form 380a of the PN can be selected along with all variants 380b, or with some combinations of these forms, by marking appropriate selection boxes. Terms are indicated as selected by a "X" marker in the appropriate box. The user is able to scroll through all PN representations using the scroll bar 380c.

7.3 Complex Nominal Representation

Complex nominals (adjacent noun pairs/sequences of non-predicating adjective and nouns) are detected by the CN detector 190. Variant synonymous CNs are automatically created by a process of recombination (whereby a CN such as "information retrieval software" might produce "information software") or expansion (whereby the CN 380d in FIG. 14B, "new products," is expanded to the synonymous CN "new commodity"). The original CN is shown in a window labeled "Term Alternatives" as the root phrase or term 380d, followed by possible recombinations and expansions 380e. The user is able to select which CNs and expansions are appropriate by placing an "X" marker in the appropriate box.

This feature may be added to single term expansion, and other methods, such as statistical thesaurus building.

7.4 Meta-Phrase Identification

Meta-phrase identification (MDI) is the representation of several, high-level dimensions of meaning or intention in a query statement (the analogous process in document processing is text structure). This processing (by meta-phrase identifier 180) is based on discourse theory and labels the discourse component requirements of a query using a suite of tags. "Review of Your Request" screen 370 displays all the possible meta-phrase tags assigned to the query representation under the heading "Request Preferences". This labeling is not exclusive: Any combination of tags is possible and tag assignments can be changed or added to by the user. The tags shown here are a subset of possible discourse-level requirement tags.

7.5 Time Frame Representation

The meta-phrase identifier also identifies the temporal requirements of the query statement, which is displayed under the heading "Time Frame". The temporal sense of the query is determined using a range of processing tools discussed earlier in this application. Several tags may be assigned to the query. The user is able to alter the selection using the appropriate selection boxes.

7.6 Single Term Representation

Single terms 370e, 370f are recognized by the DR-LINK system and displayed in the mandatory terms window, along with all PNs and CNs. Users are free to add additional terms as appropriate using the add terms window and "Add" button. For a discussion of mandatory and non-mandatory terms, see the discussion below.

7.7 Subject Field Code (SFC) Representation

SFC 250 generates a concept-level description of the query's contents. Any of a plurality of subject field codes are assigned to the query statement, based on the disambiguated codes assigned to each substantive word or phrase in the query. Codes are also assigned weights dependent on the relative prevalence of a code in the query. All codes that relate to the contents of the query are displayed in window 370d under the heading "Subject Areas of your Request," with codes ordered according to the weight assignments. The user is free to select or deselect any of the codes using the appropriate selection boxes. It is also possible that the user can add terms to the SFC input screen, and view expansions. In an alternative embodiment, the user can also adjust the relative weights of the codes.

7.8 Mandatory Term Selection

As discussed in earlier sections of this application, the DR-LINK system is able to distinguish those aspects of a query that are considered mandatory for retrieval, and divides the query representation into mandatory and non-mandatory terms. Relevance is partly determined for documents using the aspects of the query. Subsequent foldering of the documents, and their relative ranking for retrieval, is based in part on the assignment of mandatory tags to terms. All terms (PNs, CNs and single terms) from the query are displayed in the window labeled "Select the terms that MUST occur . . . " in the order in which they appear in the original query text. Terms that the DR-LINK system has determined are mandatory are automatically pre-assigned a mandatory tag, indicated by an "X" in the selection box next to the query. The user is free to alter the mandatory assignment for any or all terms. New terms can also be added to the query representation by using the add terms window and "Add" button. These new terms can be PNs, CNs or single terms.

8.0 Managing and Interacting with the Retrieved Documents

8.1 Matcher

The user, having reviewed the QP's analysis, and provided input as described above, can continue the search by clicking on the "Continue Search Button" 370h. The user can also click the "Return to Request" button 370i and modify the query. Matcher 55 takes the QP-based query representation, either unmodified or modified by the user as described above, and finds suitably similar documents in a range of databases. The matching process involves finding similarities or analogues in documents based on morphological, lexical, syntactic, semantic, discourse, and pragmatic level features. The QP produces several variant representations of the query, using logical structures, SFC-based representation, and other representations of the query contents. Matching with documents takes into account the similarity of documents to a query at the full-document level and within subdivisions of the document, called logical paragraphs. Documents are represented in index file 75 with the representation being largely similar to the representation of the query produced by the DR-LINK QP module. Thus each document index file has a SFC vector representation, like a query, along with a representation based on terms and term expansions, and the presence within the document of various other features and attributes at various levels (discourse, conceptual, lexical, etc.), as described herein. In normal operation the document index file will have been created prior to the creation of a query. In a current awareness updating application the processing of the documents is done on the fly and the process or processing and reviewing queries is done in advance and the query representation stored.

The output of the matcher is a ranked lists of documents, later assigned to folders. The inclusion of a document within a folder is based on various logical requirements (e.g., the presence or absence of mandated terms), and the rank position of a document within each folder is determined by a similarity score computed in the DR-LINK matcher.

8.2 Retrieval/Foldering Criteria

Figure 15:
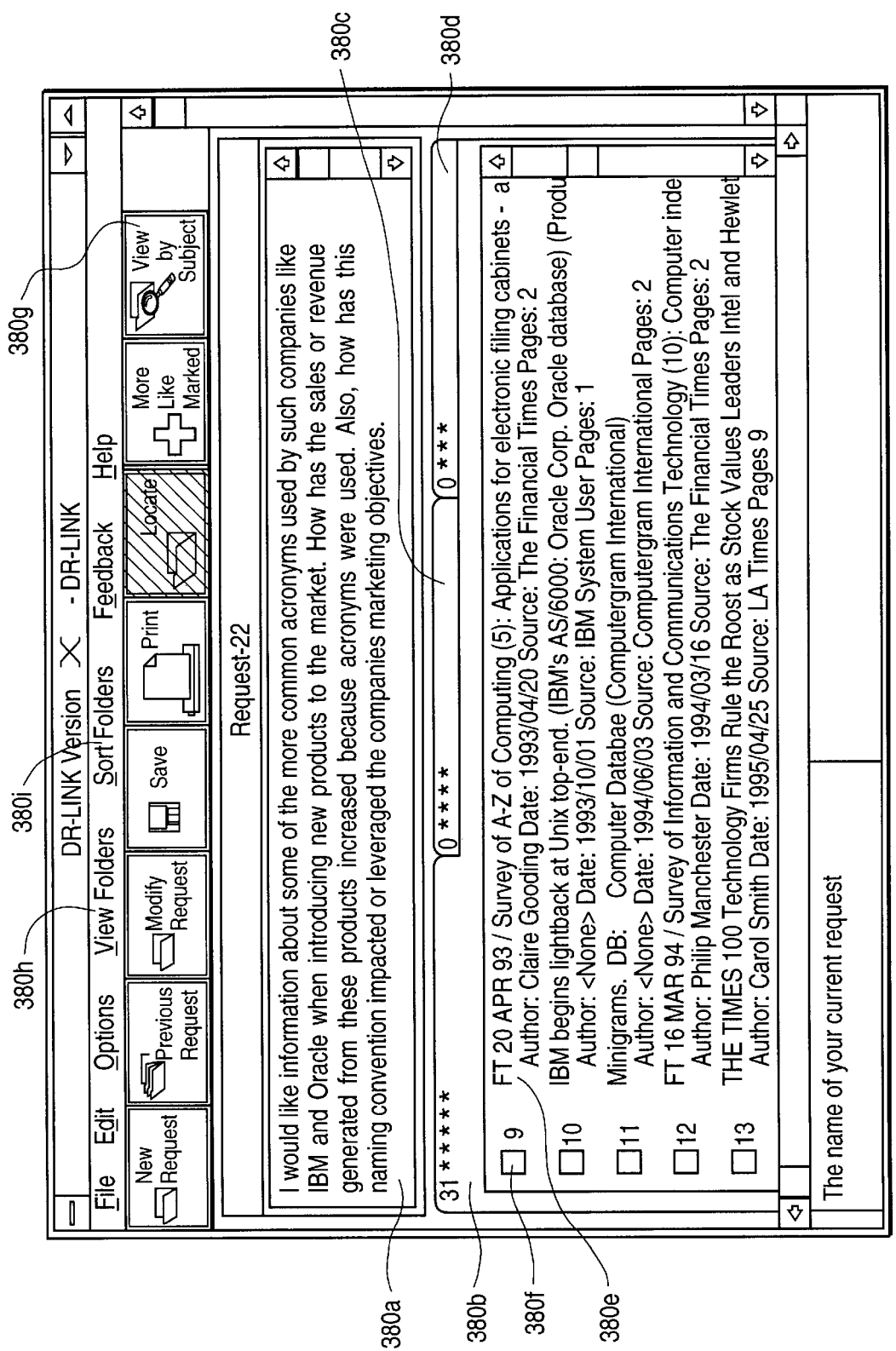
FIG. 15 is the retrieved documents view screen (document headlines in folders)

FIG. 15 shows a retrieved documents screen 380. In the initial case documents deemed sufficiently relevant to the requirements stated in a query 380a are placed in one of three folders 380b, 380c, and 380d. In this preferred embodiment, the location of a document in a specific folder is based on the presence or absence in the document of query terms, negation, and mandated terms, as discussed in detail above. For example, one set of criteria for a document to be placed in Folder One is that all query terms (complex nominals or expansions, proper nouns or expansions, and single terms) match, and no negated terms are present. Foldering is performed automatically, based on default or user-selected criteria, discussed in detail below. The rank position of a document within a folder is also computed automatically, using similarity scores from matcher 55 for the whole document and for logical paragraphs.

There are three folders in the preferred embodiment discussed here. Other arrangements of folders and variant criteria for matching are possible. Some variations are discussed in this application. The full query is restated at the top of the screen, with the three folders indicated by tabs and stars. The total number of documents in each folder is stated on each folder tab (e.g., in FIG. 15 a total of 31 documents are assigned to Folder One). Documents are shown in citation form 380e, with overall rank position, source, date, headline/title, author and number of pages indicated. Documents can be selected by marking the appropriate selection box 380f. Other document representations are possible, and are discussed later in the application.

In the general case, retrieved documents can be displayed using two criteria: Foldering and Sorting. Foldering is the process whereby documents are arranged in discrete groups according to user-defined criteria. This is the top-level mechanism for arranging retrieved documents. Any of the evidence sources used for document indexing can be used alone or in any combination as criteria for foldering. For example, folders can be created according to subject field codes if the user clicks the "View by Subject" button 380g, by the presence of various PNS or CNs (e.g., a query requesting information about American political leaders might folder by Bob Dole, Al Gore, Bill Clinton, etc.), by source (e.g., New York Times, The Economist, etc.), or by Text Structure. Other foldering criteria are possible. Foldering criteria can be initiated by the user by selecting the "View Folders" menu bar item 380h, and then for the specific case of foldering by SFC, by using the "View by Subject" button on the navigation toolbar.

"Sorting" is the process whereby documents assigned to folders are arranged within the folder. Again, any criterion that is represented in the document index file or is created by the DR-LINK system in response to a query can be used for sorting documents (e.g., document date, match score, etc.), by having the user select the appropriate item in the "Sort Folders" menu bar item 380i.

Figure 16:
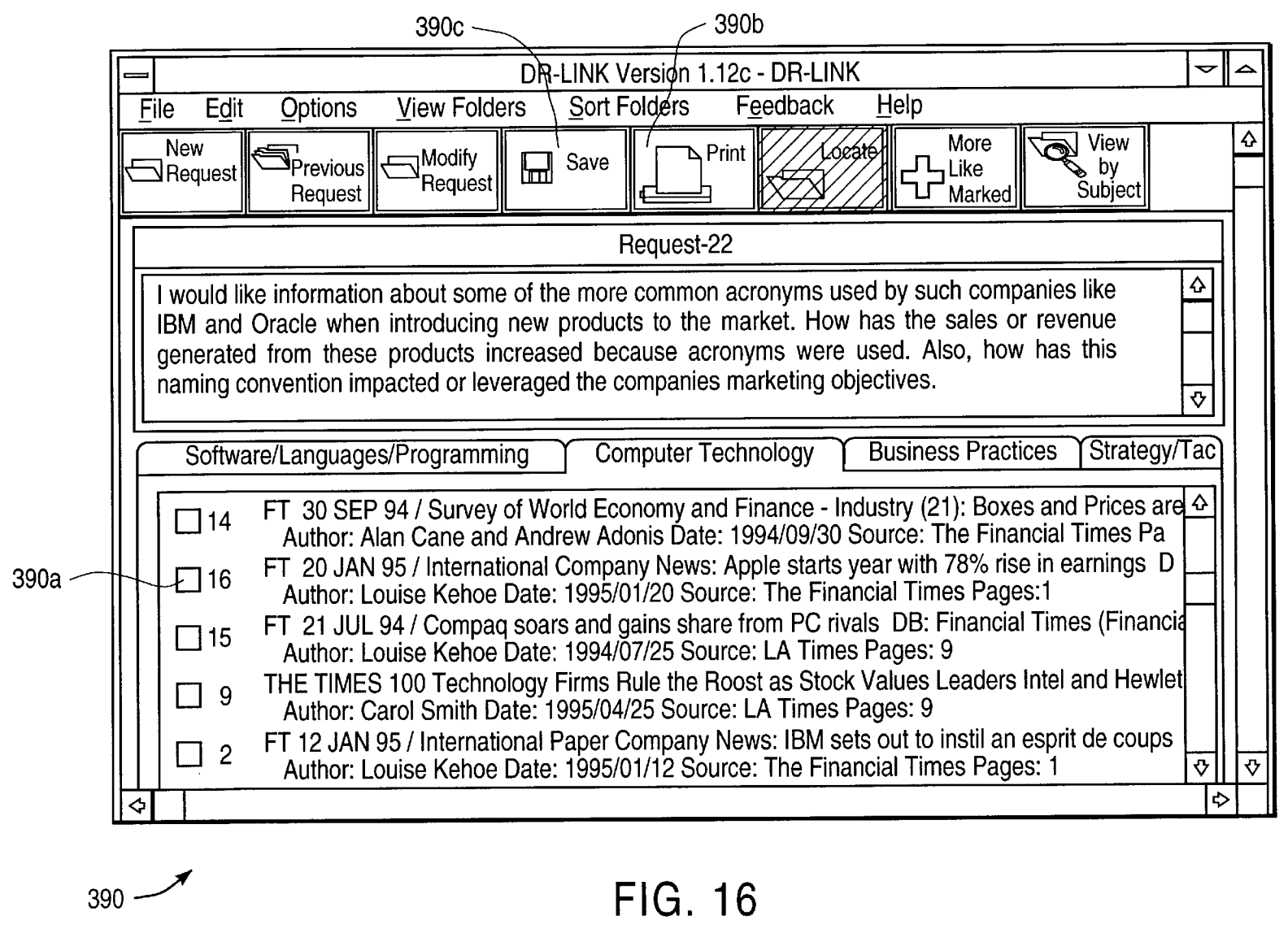

FIG. 16 shows the screen 390 for foldering according to the "View by Subject" criteria. Foldering is created using subject field code (SFC) categories. In this case, in the preferred embodiment, for all retrieved documents subject field codes are ranked according to their relative strength in the SFC vector. The top three ranked subject field codes for each document are used to determine the most prevalent SFCs across all retrieved documents, and folders are created in rank order accordingly. Documents are assigned to a SFC-based folder according to the relative strength of that code in the document's overall SFC vector, using predetermined or user-selected cut-off criteria. Documents can thus appear in a plurality of folders. Sorting within the folder can be according to any evidence source found in the index file representation of the document. For example, the sorting of documents within a folder can be according to the strength of a subject field code, date of publication, original rank position by matching score, the absence of negation, or any combination of these attributes.

8.3 Document Display Criteria

As discussed above, retrieved documents can be viewed in several different forms by the user. In the initial case, documents are displayed in folders in "short form" (see FIGS. 15 and 16). Elements of this representation are: Rank position by relevance score, beginning with the assignment "1" for the first document in the first folder; the source of the document; the author or authors; the headline or other summary text of the contents; the original date of publication; and the length or size of the document. Documents can be selected using the appropriate selection box for: Viewing in another format (e.g., full text, see below); More Like Marked (MLM) relevance feedback (see discussion below); or for printing or downloading.

Figure 17:
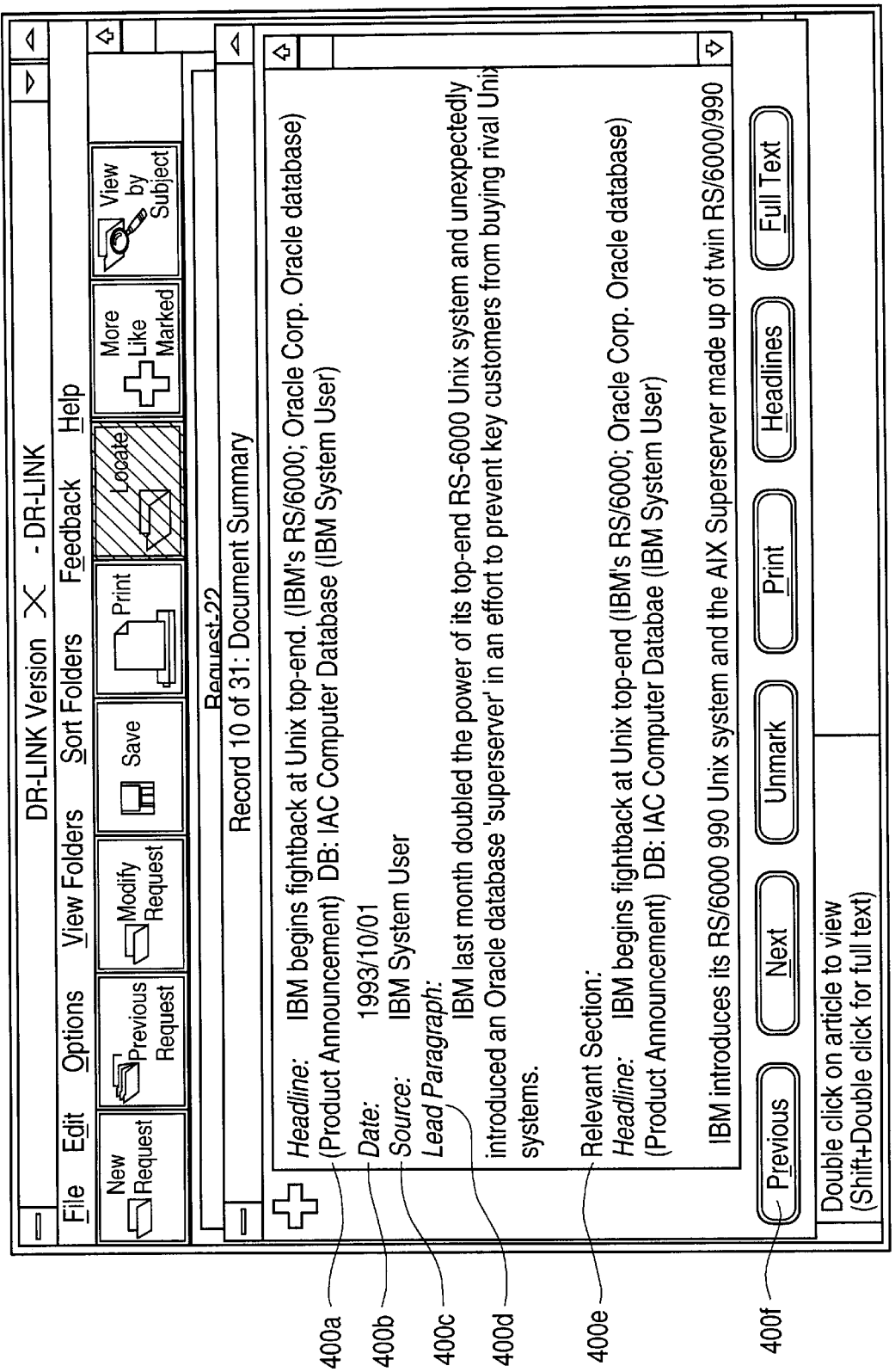
FIG. 17 is a retrieved document view screen (summary representation of a document)

FIG. 17 shows a screen 400 with articles displayed in "summary form." Elements of this representation are: Heading 400a, taken from the headline or other summary introduction to the document; a date field 400b, showing the original date of publication of the document; a source field 400c; the lead or opening paragraph of the document 400d; the most relevant paragraph or section of the document 400e; a breakdown of the proper nouns represented in the document by categories, these categories to include people, countries, nationalities, companies, etc.; a list of complex nominal and noun phrases that appear in the document, useful for modifying or fine-tuning a new query statement; and a list of subject field codes, indicating what the general subject matter of the document is. Users are able to navigate through alternate document representations, or different documents, using the buttons 400f at the bottom of the window.

Figure 18:
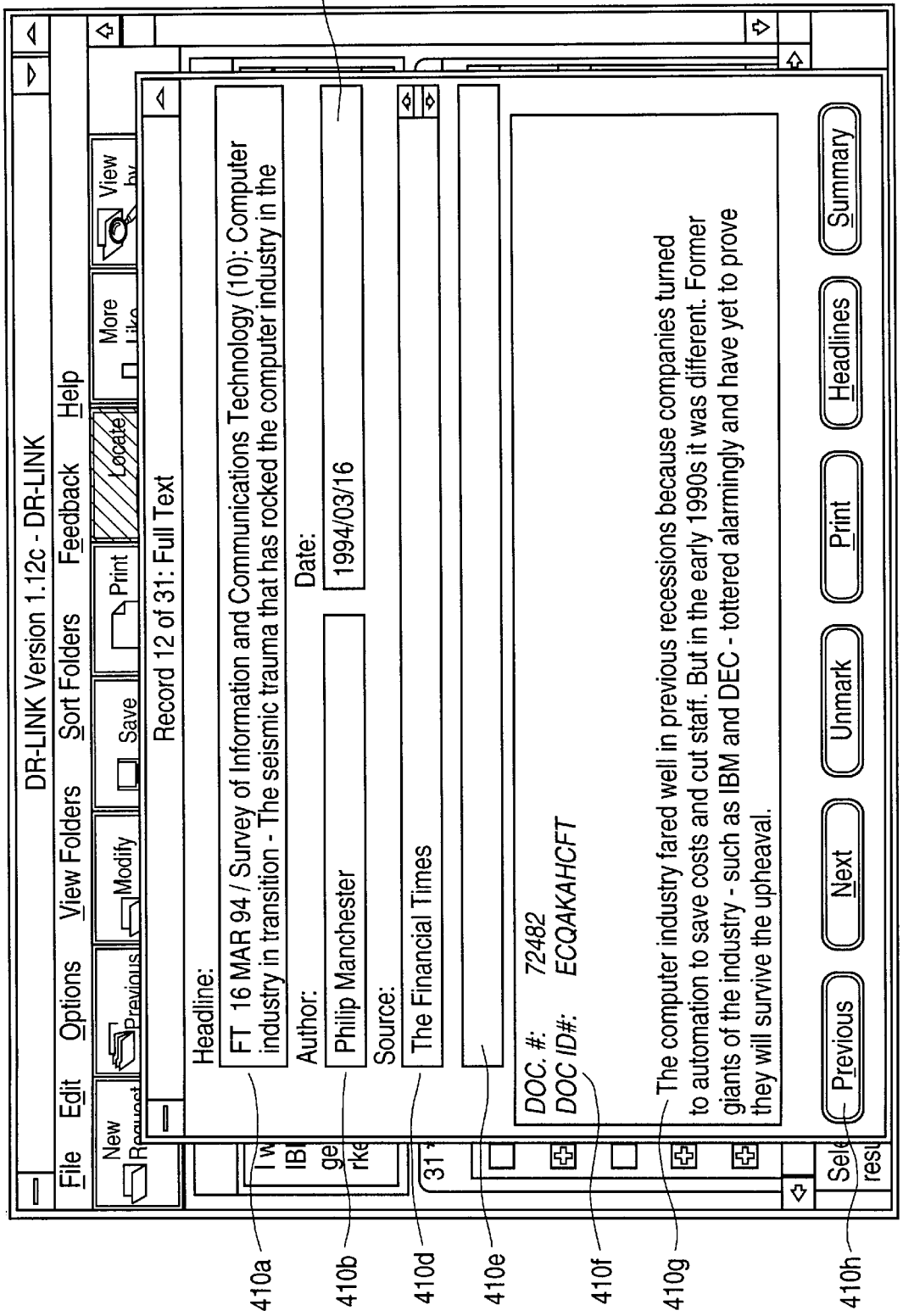
FIG. 18 is a retrieved document view screen (full text of a document)

FIG. 18 shows a screen 410 with articles displayed as full text. This full-text representation includes a formatted version of the unedited original text from the source document. Elements of the full text representation are: "Headline" field 410a which shows an actual headline or other summary text lead to the document; an author field 410b; a date field corresponding to the original date of publication 410c; a source field 410d; an informational field 410e which describes additional information about the document, such as copyright restrictions; a document number ("DOC#") and document identification ("DOC ID") field 410f displayed in the main text field, which is an internal reference system for DR-LINK which uniquely identifies each document in the corpus; a display of the full text of the document 410g; and a series of buttons 410h by which the user can navigate through the system.

8.4 Selection of Documents/Printing and Saving

Documents can be selected for downloading or printing at the user's client computer system by marking the document. Documents can be marked in the "short form" representation shown in FIG. 16 by placing an "X" in the appropriate selection box 390a, then selecting "Print" 390b or "Save" 390c from the navigation toolbar. Documents can be printed to a computer storage device as a digital file, or to a printer as hard copy. Formatting options are available for different computer systems and different printer types. Using a unique print option allows users to concatenate a sequence of documents or discrete texts (document summaries, etc.) in a single print file, even if the computing environment does not generally support such an option.

8.5 Refine Query and More Like Marked (MLM)

Figure 19:
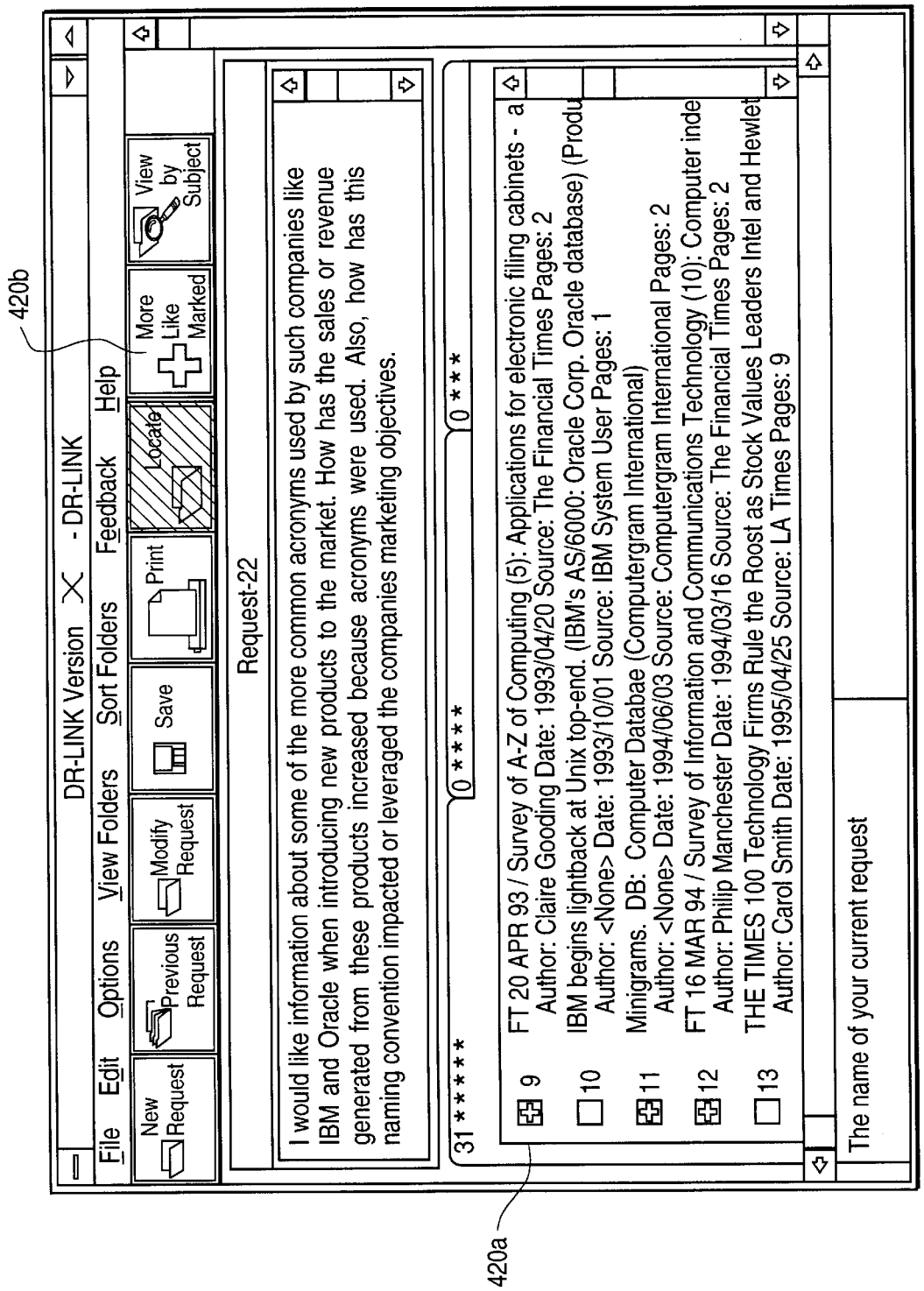
FIG. 19 is the More Like Marked (MLM) screen showing marked documents in folders.

FIG. 19 shows a screen 420, showing the use of the More Like Marked (MLM) function in the user interface. This feature invokes the DR-LINK relevance feedback system, whereby the contents of marked documents (or portions of documents) considered especially relevant by the user can be used to help formulate a new, revised query statement for document retrieval. The MLM retrieval process is similar to the retrieval mechanism described for initial query representation and matching. The revised query is represented by the sum contents of all MLM-selected documents, plus the original query representation, using the QP described in this application.

Referring to FIG. 19, documents are selected for the revised, MLM query statement by selecting documents in short form representation by marking the appropriate selection box 420a, then selecting the "More Like Marked" tool 420b from the navigation toolbar. Selecting the MLM function from the navigation toolbar instructs the DR-LINK system to reformulate a new query representation based on the subject-contents of the marked documents, along with the original query. With the revised query the user may be asked to confirm the query representation, as was the case with the original query, dependent on user-selected preference settings.

Figure 20:
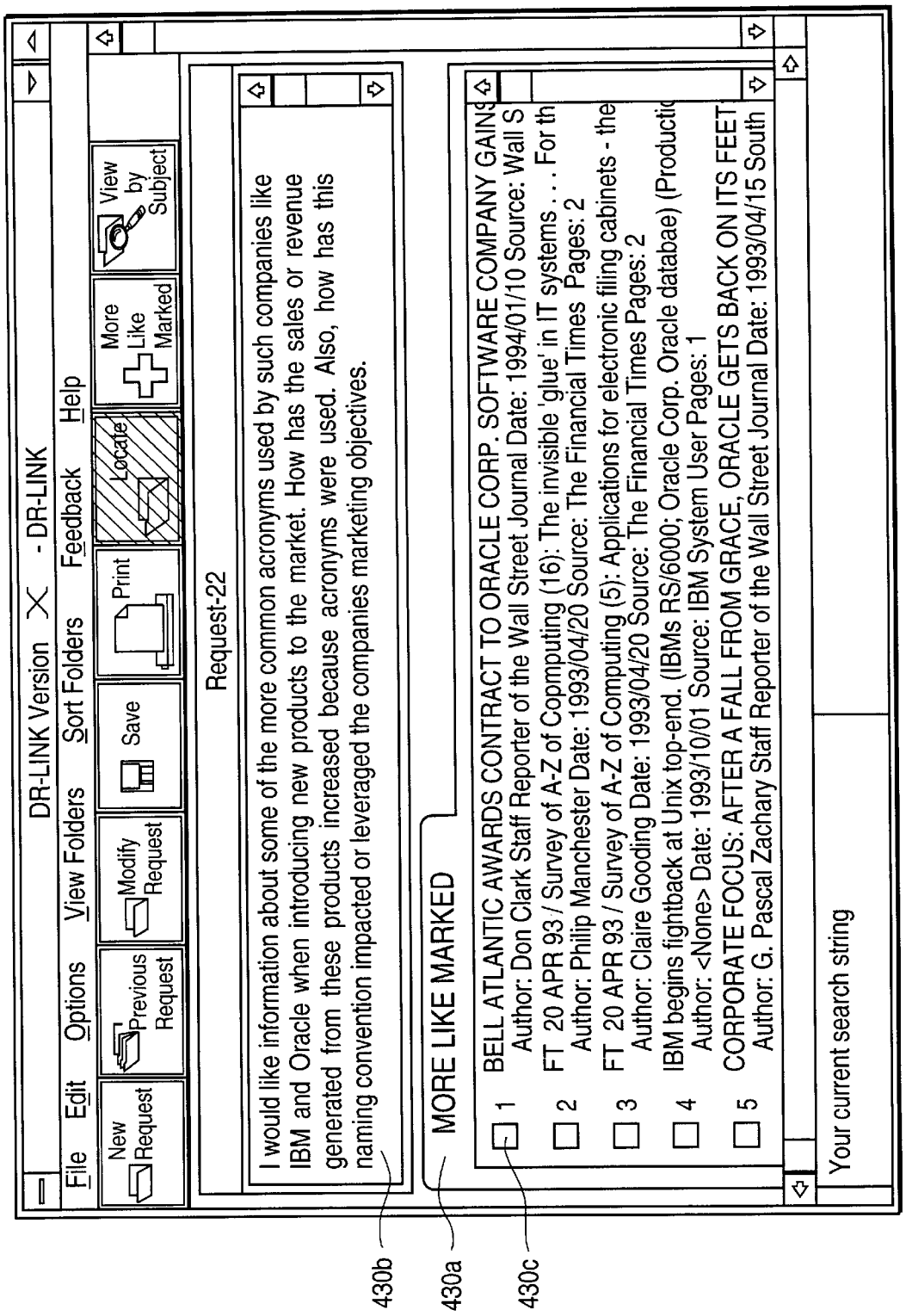
FIG. 20 is the More Liked Marked (MLM) screen showing results of a MLM-based query.

FIG. 20 shows a screen 420 that is presented once the DR-LINK system has retrieved documents judged to be relevant to the revised query. All the documents are placed in a single file 430a marked "More Like Marked." This screen shows the original query statement 430b, along with the retrieved documents in short form representation, ranked according to their relevance score 430c. The system will display the same number of documents that was chosen for the original query. Documents in the MLM folder can be viewed according to any of the display, foldering and sorting criteria discussed above.

8.6 Variations on MLM

There are a number of different ways to implement the MLM functionality. First, while the current implementation combines the selected (or marked) document representations with the initial query representation to generate a revised query representation, it is also possible to base the query entirely on the document representations, and ignore the initial query representation. Additionally, while it is possible to rely on the stored document representations, it may be more efficient, especially if the user selects only portions of a document, to reprocess the selected documents to generate the revised query. In a current implementation, the latter is done.

The MLM functionality gives rise to an additional way to use the DR-LINK processing capabilities. A set of documents need not arise from running a query using the DR-LINK system. Any collection of relevant documents, including a single document, could be used to formulate a query to find additional documents like the collection. These documents need only be identified to the DR-LINK system and processed as if they were MLM documents arising from a query. If the documents were not in the database, their representations would have to be generated and combined.

Prior art searching is an example of an application where such a "queryless search" capability could be particularly useful. The user could be aware of a set of documents, which had they been published earlier, would be highly relevant prior art. By identifying such documents, the user could run a query whose representation was based on these documents. By limiting the search to an early enough date range, the retrieved documents would be highly likely to represent highly relevant prior art.

8.7 New Request

At any time in the retrieval process the user is able to request to generate a new query statement by selecting "New Request" from the navigation toolbar. This takes the user back to #1 in FIG. 9. It is also possible to call-up old, saved queries and rerun them again.

8.8 End

Users can exit the DR-LINK system by selecting from the menu bar "File," and then from the pull-down menu, "Exit."

9.0 References

[Liddy93] Liddy, E. D., Paik, W., Yu, E. S. & Mcvearry, K. An overview of DR-LINK and its approach to document filtering. *Proceedings of the ARPA Workshop on Human Language Technology*. Publication date: 1993.

[Liddy94a] Liddy, E. D. & Myaeng, S. H. (1994). DR-LINK System: Phase I Summary. *Proceedings of the TIPSTER Phase I Final Resort*.

[Liddy94b] Liddy, E. D., Paik, W., Yu, E. S. & McKenna, M. (1994). Document retrieval using linguistic knowledge. *Proceedings of RIAO '94 Conference*.

[Liddy94c] Liddy, E. D., Paik, W., Yu, E. S. Text categorization for multiple users based on semantic information from an MRD. ACM *Transactions on Information Systems*. Publication date: 1994. Presentation date: July, 1994.

[Liddy95] Liddy, E. D., Paik, W., McKenna, M. & Yu, E. S. (1995) A natural language text retrieval system with relevance feedback. *Proceedings of the 16th National Online Meeting*.

[Gentner81] Gentner, David. (1981) Some interesting differences between verbs and nouns. *Cognition and brain theory* 4(2), 161–178.

[Hanson90] Hanson, Stephen Jose. (1990) Conceptual clustering and categorization: bridging the gap between induction and causal models. In Yves Kodratoff & Ryszard Michalski (eds.) *Machine Learning, Volume III*. Morgan Kaufmann Publishers: San Mateo, Calif.

[Paik93a] Paik, W., Liddy, E. D., Yu, E. S. & McKenna, M. Categorizing and standardizing proper nouns for efficient information retrieval. *Proceedings of the ACL Workshop on Acquisition of Lexical Knowledge from Text*. Publication date: 1993.

[Paik93b] Paik, W., Liddy, E. D., Yu, E. S. & McKenna, M. Interpretation of Proper Nouns for Information Retrieval. *Proceedings of the ARPA Workshop on Human Language Technology*. Publication date: 1993.

[Salton89] Salton, Gerald. (1989) *Automatic Text Processing*. Addison-Westley Publishing: Reading Mass.

[VanDijk88] VanDijk, Teun A. (1988) *News Analysis*. Lawrence Erlbaum Associates: Hillsdale, N.J.

10.0 Conclusion

In conclusion, the present invention provides a robust and efficient method for implementing an information retrieval system that offers users the opportunity to fully interact with the retrieval process. Specifically, the retrieval system uses natural language processing (NLP) techniques to represent, index, and retrieve texts at the multiple levels (e.g., the morphological, lexical, syntactic, semantic, discourse, and pragmatic levels) at which humans construe meaning in writing.

Using a graphic user interface (GUI), the retrieval system interacts with the user to formulate a complex representation of the subject-contents of a query statement expressed in fully-formed sentences. Users can state queries as natural text of any length or complexity, as if they were expressing an information need to an expert in the field. The retrieval system automatically generates alternative representations of the subject-contents of the query, presenting these representations to the user for modification as required. The interaction of the user with the underlying query processing modules of the retrieval system allows users to state their information needs in a complex, precise form.

The described retrieval system also allows the user to interact with the retrieval matching engine through a flexible, sophisticated system of foldering and sorting. The matching of documents to a query is based on a number of evidence sources. This retrieval system allows users to state multiple criteria for retrieving documents and for arranging those retrieved documents in rank order within related clusters or folders.

Users are also able to re-state queries using relevance feedback techniques. In the initial retrieval process, the documents deemed highly relevant can be used to reformulate a new, revised query. The subject-contents of marked documents are used to generate a new query representation.

While the above is a complete description of specific embodiments of the invention, various modifications, alterations, alternative constructions, and equivalents can be used. For example, the described invention is not restricted to operation within certain specified computer environments, but is free to operate within a plurality of computer environments. While the preferred embodiment employs a specified range of interactions with the user through the GUI, the sequence and number of these interactions is not essential for operation.

The evidence sources used to create representations of texts (documents or queries) is described in specific detail in this application. The general method of interaction and retrieval is not dependent on all sources of evidence being used, or restricted to only those sources described. While a specific series of GUI screen illustrations are used in this application, the method of interaction between the user and the underlying retrieval system is not dependent on the specific arrangement of elements in each screen and alternative arrangements are possible.

Therefore, the above description should not be taken as limiting the scope of the invention as defined by the appended claims.

What is claimed:

1. A method of operating a computerized information retrieval system where information is retrieved from a database containing documents in response to user queries, the method comprising the steps of:

receiving a natural language query specifying information to be retrieved;

detecting evidence sources from the query;

determining discourse aspects, such as temporal information or intention information, based on the detected evidence sources;

generating a score for each of the determined discourse aspects using a statistical evidence combination method;

generating an alternative representation of the query based on the discourse aspects whose scores exceed a predetermined threshold score;

processing documents in the database to tag such documents for such discourse aspects;

matching the alternative representation of the query against the database by determining a measure of relevance for each document; and providing a set of documents that satisfy a retrieval criterion.

2. The method of claim 1 wherein the statistical evidence combination method uses a regression formula.

3. A method of operating a computerized information retrieval system where information is retrieved from a database containing documents in response to user queries, the method comprising the steps of:

receiving a natural language query specifying information to be retrieved;

generating an alternative representation of the query that includes a plurality of different individual representations of the query;

defining a plurality of evidence sources based on the different individual representations of the query;

for each document, determining similarity scores for each evidence source in the plurality of evidence sources, and combining the plurality of similarity scores for that document using a regression formula to determine a measure of relevance; and providing a set of documents that satisfy a retrieval criterion based on the measures of relevance of the documents.

4. The method of claim 3 wherein:

the plurality of individual representations include at least one conceptual level representation and at least one term-based representation.

5. The method of claim 3 wherein:

at least one of the individual representations of the query includes a logical structure based on at least some of the terms in the query.

6. A method of operating a computerized information retrieval system where information is retrieved from a database containing documents in response to user queries, the method comprising the steps of:

receiving a natural language query specifying information to be retrieved;

extracting terms that appear in the query;

detecting words that indicate multi-part proper nouns in the query;

if a word indicates that two proper nouns around the word is in fact one name, determining the boundary of each name which consists of one or more proper nouns;

classifying the boundary determined proper nouns into one category from a plurality of pre-determined conceptual categories, including determining the one category using information revealed by noun phrases in close proximity to the boundary determined proper nouns;

converting the classified proper noun into a commonly recognized standard form;

generating an alternative representation of the query that includes both the category which is assigned to the proper noun and the standard form of the proper noun in the query;

processing documents in the database to tag the documents for proper nouns;

matching the alternative representation of the query against the database by determining a measure of relevance for each document; and providing a set of documents that satisfy a retrieval criterion.

\* \* \* \* \*